United States Patent
Lysejko et al.

(10) Patent No.: US 6,222,819 B1
(45) Date of Patent: Apr. 24, 2001

(54) PROCESSING DATA TRANSMITTED AND RECEIVED OVER A WIRELESS LINK CONNECTING A CENTRAL TERMINAL AND A SUBSCRIBER TERMINAL OF A WIRELESS TELECOMMUNICATIONS SYSTEM

(75) Inventors: Martin Lysejko, Bagshot (GB); Paul F. Struhsaker, Plano, TX (US)

(73) Assignee: Airspan Networks, Inc., Seattle, WA (US)

( * ) Notice: Subject to any disclaimer, the term of this patent is extended or adjusted under 35 U.S.C. 154(b) by 0 days.

(21) Appl. No.: 08/978,970

(22) Filed: Nov. 26, 1997

(30) Foreign Application Priority Data

Dec. 20, 1996 (GB) .................................. 9626566

(51) Int. Cl.⁷ .................................................. H04J 11/00
(52) U.S. Cl. .......................................... 370/209; 370/342
(58) Field of Search .................................. 370/203, 208, 370/209, 320, 335, 342, 343, 441, 479; 375/130, 146, 147

(56) References Cited

U.S. PATENT DOCUMENTS

| | | | |
|---|---|---|---|
| 5,373,502 | 12/1994 | Turban | 370/18 |
| 5,414,728 | 5/1995 | Zehavi | 375/200 |
| 5,764,630 | * 6/1998 | Natali et al. | 370/320 |
| 5,793,759 | * 8/1998 | Rakib et al. | 370/342 |
| 5,956,345 | * 9/1999 | Allpress et al. | 370/480 |

FOREIGN PATENT DOCUMENTS

| | | | |
|---|---|---|---|
| 0633676 | 1/1995 | (EP) | H04J/13/00 |
| 0652650 | 5/1995 | (EP) | H04B/7/26 |
| 0730356 | 9/1996 | (EP) | H04L/1/00 |
| 2267627 | 12/1993 | (GB) | H04B/7/00 |
| 2301744 | 12/1996 | (GB) | H04Q/7/32 |
| 9314588 | 7/1993 | (WO) | . |
| 9503652 | 2/1995 | (WO) | H04B/7/26 |
| 9637066 | 11/1996 | (WO) | H04L/27/30 |

* cited by examiner

*Primary Examiner*—Wellington Chin
*Assistant Examiner*—Kwang B. Yao
(74) *Attorney, Agent, or Firm*—Baker Botts L.L.P.

(57) ABSTRACT

The present invention provides a transmission controller and method for processing data items to be transmitted over a wireless link connecting a central terminal and a subscriber terminal of a wireless telecommunications system, a single frequency channel being employed for transmitting data items pertaining to a plurality of wireless links. The transmission controller comprises an orthogonal code generator for providing an orthogonal code from a set of 'm' orthogonal codes used to create 'm' orthogonal channels within the single frequency channel, and a first encoder for combining a data item to be transmitted on the single frequency channel with said orthogonal code from the orthogonal code generator, the orthogonal code determining the orthogonal channel over which the data item is transmitted, whereby data items pertaining to different wireless links may be transmitted simultaneously within different orthogonal channels of said single frequency channel. Further, the transmission controller comprises an overlay code generator for providing an overlay code from a first set of 'n' overlay codes which are orthogonal to each other, and a second encoder arranged to apply the overlay code from the overlay code generator to said data item, whereby 'n', data items pertaining to different wireless links may be transmitted simultaneously within the same orthogonal channel. The invention also provides a reception controller and method for processing data items received over a wireless link.

32 Claims, 16 Drawing Sheets

FIG. 5A
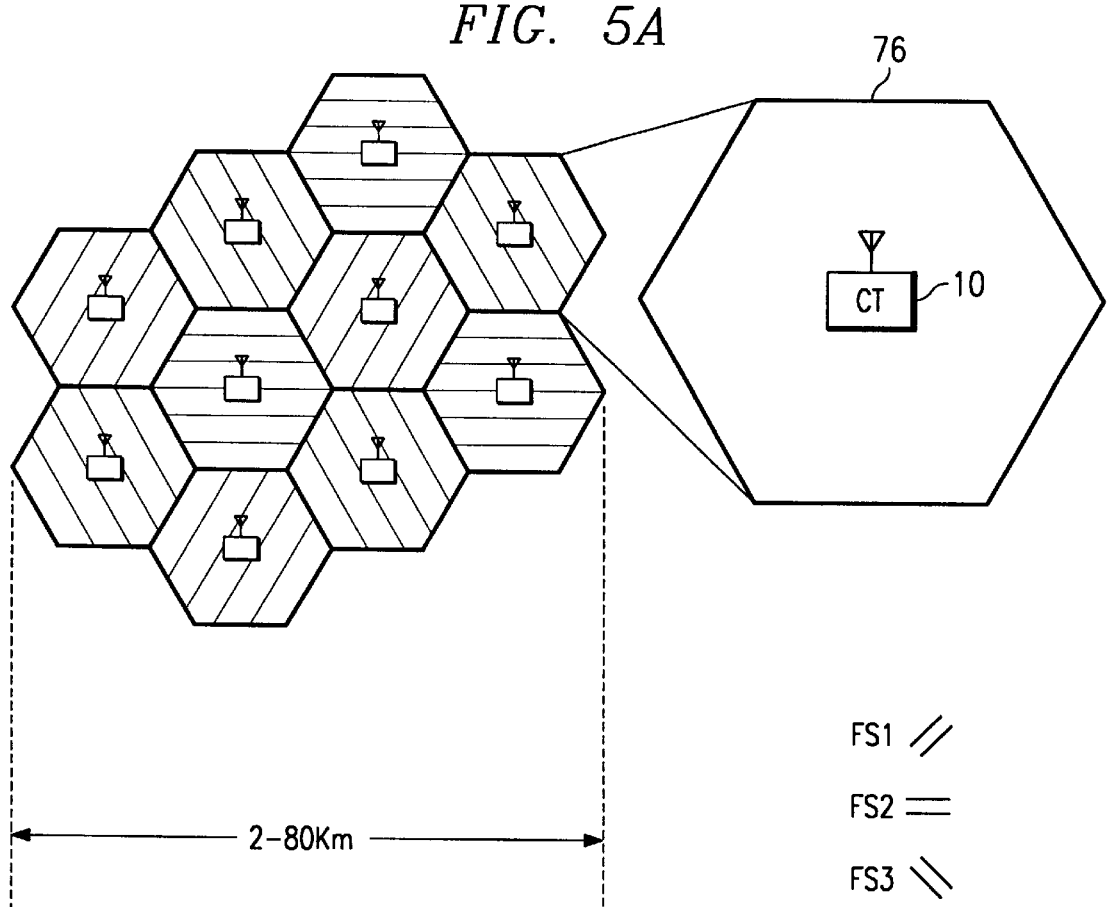
FS1
FS2
FS3
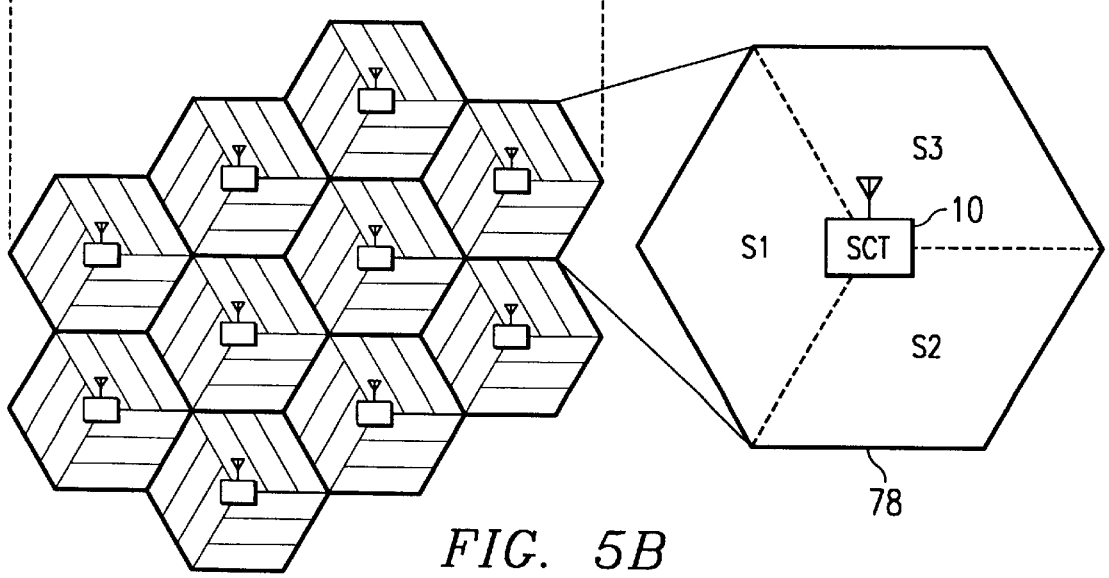
FIG. 5B

LTC = LOCKED TRAFFIC CHANNEL
FTC = FREE TRAFFIC CHANNEL
AOTC = ACCESS OUTGOING TRAFFIC CHANNEL
AITC = ACCESS INCOMING TRAFFIC CHANNEL
BTC = BUSY TRAFFIC CHANNEL
PTC = PRIORITY TRAFFIC CHANNEL

PROCESSING DATA TRANSMITTED AND RECEIVED OVER A WIRELESS LINK CONNECTING A CENTRAL TERMINAL AND A SUBSCRIBER TERMINAL OF A WIRELESS TELECOMMUNICATIONS SYSTEM

TECHNICAL FIELD OF THE INVENTION

The present invention relates in general to wireless telecommunications systems and more particularly to techniques for processing data transmitted and received over a wireless link connecting a central terminal and a subscriber terminal of a wireless telecommunications system.

BACKGROUND OF THE INVENTION

A wireless telecommunications system has been proposed in which a geographical area is divided in to cells, each cell having one or more central terminals (CTs) for communicating over wireless links with a number of subscriber terminals (STs) in the cell. These wireless links are established over predetermined frequency channels, a frequency channel typically consisting of one frequency for uplink signals from a subscriber terminal to the central terminal, and another frequency for downlink signals from the central terminal to the subscriber terminal.

Due to bandwidth constraints, it is not practical for each individual subscriber terminal to have its own dedicated frequency channel for communicating with the central terminal. Hence, techniques need to be applied to enable data items relating to different wireless links to be passed over the same frequency channel without interfering with each other. In current wireless telecommunications systems, this can be achieved through the use of a 'Code Division Multiple Access' (CDMA) technique. One way to implement CDMA is through the application of a set of orthogonal codes to the data items to be transmitted on a particular frequency channel, data items relating to different wireless links being combined with different orthogonal codes from the set. A suitable set of orthogonal codes is a "Rademacher-Walsh" (RW) set of sixteen 16-bit codes. Orthogonal codes have the property that, when perfectly aligned, all codes cross-correlate to zero, thus making it possible to decode a signal to which one orthogonal code has been applied while cancelling interference from signals to which different orthogonal codes have been applied.

Signals to which an orthogonal code has been applied can be considered as being transmitted over a corresponding orthogonal channel within a particular frequency channel. Hence, considering the example of a set of 16 RW codes, 16 orthogonal channels can be created within a single frequency channel, and hence up to sixteen separate communication signals (corresponding to sixteen separate wireless links) can be transmitted simultaneously over the single frequency channel if different RW codes are applied to each communication signal.

It is known to provide a number of modem shelves within one central terminal, and for each modem shelf to employ a different frequency channel. Hence, if a central terminal has four modem shelves, and the set of 16 RW codes is employed for each frequency channel, one central terminal would be able to support wireless links with up to 60 subscriber terminals simultaneously.

However, as more subscribers subscribe to the wireless telecommunications network, it is becoming desirable to support more and more subscriber terminals from each central terminal. There are only a limited number of frequency channels that can be allocated to the wireless telecommunications system, and as it is desirable for neighbouring cells to use different frequency channels so as to reduce interference, the demand cannot be met by merely adding more modem shelves to each central terminal.

SUMMARY OF THE INVENTION

According to the present invention, there is provided a transmission controller for processing data items to be transmitted over a wireless link connecting a central terminal and a subscriber terminal of a wireless telecommunications system, a single frequency channel being employed for transmitting data items pertaining to a plurality of wireless links, the transmission controller comprising: an orthogonal code generator for providing an orthogonal code from a set of 'm' orthogonal codes used to create 'm' orthogonal channels within the single frequency channel; a first encoder for combining a data item to be transmitted on the single frequency channel with said orthogonal code from the orthogonal code generator, the orthogonal code determining the orthogonal channel over which the data item is transmitted, whereby data items pertaining to different wireless links may be transmitted simultaneously within different orthogonal channels of said single frequency channel; an overlay code generator for providing an overlay code from a first set of 'n' overlay codes which are orthogonal to each other; and a second encoder arranged to apply the overlay code from the overlay code generator to said data item, whereby 'n' data items pertaining to different wireless links may be transmitted simultaneously within the same orthogonal channel.

Viewed from a second aspect, the present invention provides a reception controller for processing data items received over a wireless link connecting a central terminal and a subscriber terminal of a wireless telecommunications system, a single frequency channel being employed for transmitting data items pertaining to a plurality of wireless links, the receiver controller comprising: an orthogonal code generator for providing an orthogonal code from a set of 'm' orthogonal codes used to create 'm' orthogonal channels within the single frequency channel; a first decoder for applying, to signals received on the single frequency channel, the orthogonal code provided by the orthogonal code generator, in order to isolate data items transmitted within the corresponding orthogonal channel; an overlay code generator for providing an overlay code from a first set of 'n' overlay codes which are orthogonal to each other, the set of 'n' overlay codes enabling 'n' data items pertaining to different wireless links to be transmitted simultaneously within the same orthogonal channel; and a second decoder for applying, to the data items of the orthogonal channel, the overlay code from the overlay code generator so as to isolate a particular data item transmitted using that overlay code.

By using overlay codes in addition to the known set of orthogonal codes, it is possible for selected orthogonal channels to be subdivided to form additional orthogonal channels. For example, if there are originally sixteen orthogonal channels and a set of four overlay codes are defined, each orthogonal channel being subject to overlay codes, then up to 64 orthogonal channels can be defined. By application of appropriate orthogonal codes and overlay codes, up to 64 separate communication signals could be sent simultaneously on the one frequency channel, albeit at a quarter of the rate that the communication signals could be transmitted if the overlay codes were not used.

Such an approach has the advantage that it preserves compatibility with current hardware and software equipment which use the set of orthogonal codes, but which do not support the use of overlay codes. By designating certain orthogonal channels as channels for which overlay codes are not used, the current equipment can communicate over those channels without any changes being required to the equipment.

In preferred embodiments, the overlay code generator is arranged to store one or more further sets of overlay codes having different numbers of overlay codes to the first set of overlay codes. This enables the orthogonal channels to be subdivided differently, depending on which set of overlay codes is selected. For instance, if an orthogonal channel operates at 160 kb/s, and a set of four overlay codes is used to subdivide that orthogonal channel, then four 40 kb/s orthogonal channels can be created from the one original orthogonal channel. If, alternatively, a set of two overlay codes is used, then two 80 kb/s orthogonal channels can be created from the one orthogonal channel. This flexibility is useful, since for some communications, eg. fax, a rate of 40 kb/s may not be acceptable, and hence a set of four overlay codes would not be suitable.

The orthogonal code generator and overlay code generator may generate orthogonal codes and overlay codes 'on the fly' using predetermined algorithms. However, alternatively, the orthogonal code generator may be provided as a storage arranged to store the set of orthogonal codes, and the overlay code generator may be provided as a storage arranged to store the set of overlay codes. Appropriate orthogonal codes and overlay codes could then be read out to the encoders or decoders as required.

In preferred embodiments, the set of orthogonal codes comprise a set of Rademacher-Walsh (RW) codes, in preferred embodiments the set comprising a 16×16 matrix of RW codes. Further, the set of overlay codes are preferably derived from RW codes, each set of 'n' overlay codes preferably comprising an n×n matrix of RW codes.

The transmission controller in accordance with the present invention may be provided within the central terminal of a wireless telecommunications system. In preferred embodiments, a first of the orthogonal channels is reserved for the transmission of signals relating to the acquisition of wireless links, and the transmission controller is provided in the central terminal to enable overlay codes to be applied to data items to be sent within said first orthogonal channel from the central terminal to one of said subscriber terminals. Similarly, a second of the orthogonal channels is preferably reserved for the transmission of signals relating to the control of calls, and the transmission controller in the central terminal also enables overlay codes to be applied to data items to be sent within said second orthogonal channel from the central terminal to one of said subscriber terminals.

However, a number of said orthogonal channels are designated as traffic channels for the transmission of data items relating to communication content, and in preferred embodiments a TDM encoder is provided within the central terminal arranged to apply time division multiplexing (TDM) techniques to data items to be sent over a traffic channel from said central terminal to said subscriber terminal, so as to enable a plurality of data items pertaining to different wireless links to be sent within one orthogonal traffic channel during a predetermined frame period.

The use of a CDMA/TDM hybrid approach for downlink traffic channels retains the benefits of CDMA access, ie. interference is reduced when traffic is reduced, and also reduces receiver dynamic range requirements.

In addition to, or as an alternative to, having a transmission controller, the central terminal may also comprise a reception controller in accordance with the present invention. Further, the central terminal preferably includes channelisation means for determining which of the orthogonal channels will be subject to overlay codes, and for transmitting that information to a plurality of subscriber terminals within the telecommunications system. This is useful since, for example, certain orthogonal channels can hence be designated as being reserved for communications with STs that do not incorporate the features necessary to support overlay codes, and which hence require a full 160 kb/s orthogonal channel.

In preferred embodiments, the channelisation means also determines, for those orthogonal channels subject to overlay codes, which set of overlay codes will apply to each orthogonal channel. This gives a great deal of flexibility in how the channels are used, since some can be subdivided whilst others are not, and those which are subdivided can be subdivided differently to yield differing numbers of differing rate channels.

As with the central terminal, a subscriber terminal of the wireless telecommunications system may comprise a transmission controller and/or a reception controller in accordance with the present invention. Unlike the central terminal, it is preferable for the subscriber terminal to use overlay codes for all types of channels, whether they be traffic channels or otherwise. On these uplink traffic channels, the pure CDMA approach using overlay codes eliminates the need to time synchronise STs to a TDM frame reference, and reduces the peak power handling requirements in the ST RF transmit chain.

Viewed from a third aspect, the present invention provides a wireless telecommunications system comprising a central terminal and a plurality of subscriber terminals, wherein the central terminal comprises a transmission controller in accordance with the present invention, and at least one of the subscriber terminal comprises a reception controller in accordance with the present invention. Alternatively, or additionally, within the wireless telecommunications system, at least one of the subscriber terminals may comprise a transmission controller in accordance with the present invention, and the central terminal may comprise a reception controller in accordance with the present invention.

Viewed from a fourth aspect, the present invention provides a method of processing data items to be transmitted over a wireless link connecting a central terminal and a subscriber terminal of a wireless telecommunications system, a single frequency channel being employed for transmitting data items pertaining to a plurality of wireless links, the method comprising the steps of: providing an orthogonal code from a set of 'm' orthogonal codes used to create 'm' orthogonal channels within the single frequency channel; combining a data item to be transmitted on the single frequency channel with said orthogonal code, the orthogonal code determining the orthogonal channel over which the data item is transmitted, whereby data items pertaining to different wireless links may be transmitted simultaneously within different orthogonal channels of said single frequency channel; providing an overlay code from a first set of 'n' overlay codes which are orthogonal to each other; and applying the overlay code to said data item, whereby 'n' data items pertaining to different wireless links may be transmitted simultaneously within the same orthogonal channel.

Viewed from a fifth aspect, the present invention provides a method of processing data items received over a wireless link connecting a central terminal and a subscriber terminal of a wireless telecommunications system, a single frequency channel being employed for transmitting data items pertaining to a plurality of wireless links, the method comprising the steps of: providing an orthogonal code from a set of 'm' orthogonal codes used to create 'm' orthogonal channels within the single frequency channel; applying, to signals received on the single frequency channel, the orthogonal code in order to isolate data items transmitted within the corresponding orthogonal channel; providing an overlay code from a first set of 'n' overlay codes which are orthogonal to each other, the set of 'n' overlay codes enabling 'n' data items pertaining to different wireless links to be transmitted simultaneously within the same orthogonal channel; and applying, to the data items of the orthogonal channel, the overlay code so as to isolate a particular data item transmitted using that overlay code.

By using overlay codes in addition to the known set of orthogonal codes, it is possible for selected orthogonal channels to be subdivided to form additional orthogonal channels, thereby making it possible to support more wireless links on one frequency channel.

BRIEF DESCRIPTION OF THE INVENTION

An embodiment of the invention will be described hereinafter, by way of example only, with reference to the accompanying drawings in which like reference signs are used for like features and in which:

FIGS. 5A and 5B are schematic diagrams illustrating possible configurations for cells for the telecommunications system of FIG. 1;

DETAILED DESCRIPTION OF THE INVENTION

Figure 1:
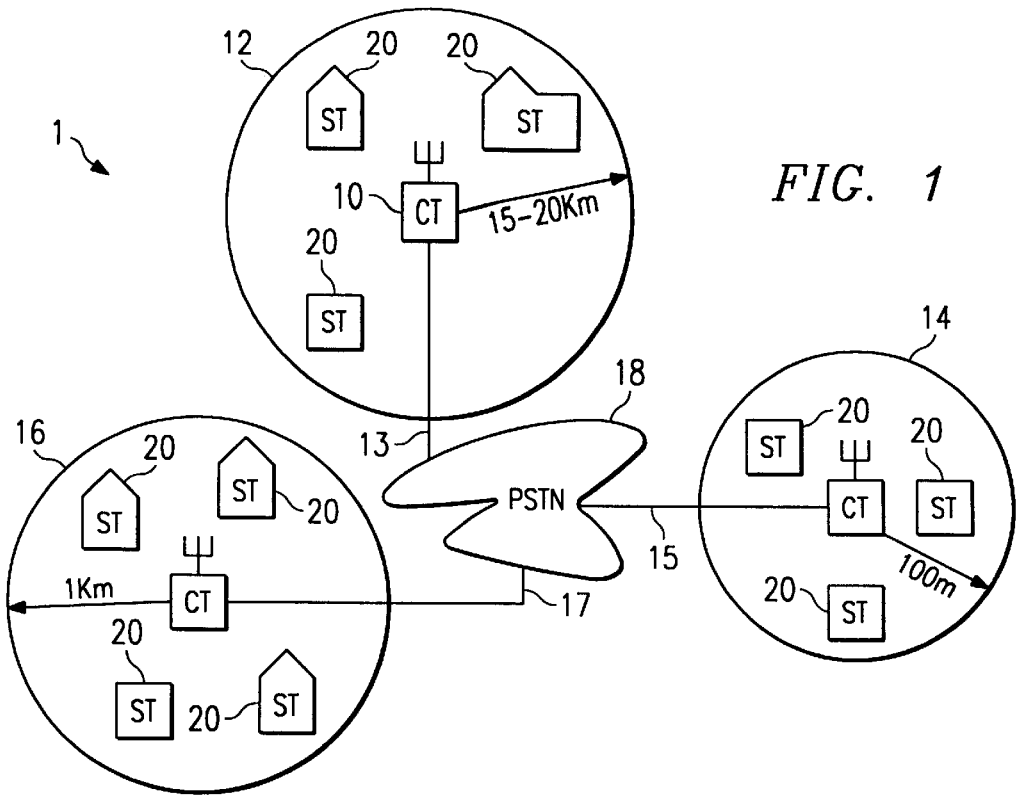
FIG. 1 is a schematic overview of an example of a wireless telecommunications system in which an example of the present invention is included.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where is there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing fixed microwave links between subscriber terminals 20 at fixed locations within a service area (e.g., 12, 14, 16) and the central terminal 10 for that service area. Each subscriber terminal 20 can be provided with a permanent fixed access link to its central terminal 10, but in preferred embodiments demand-based access is provided, so that the number of subscribers which can be supported exceeds the number of available wireless links. The manner in which demand-based access is implemented will be discussed in detail later.

Figure 2:
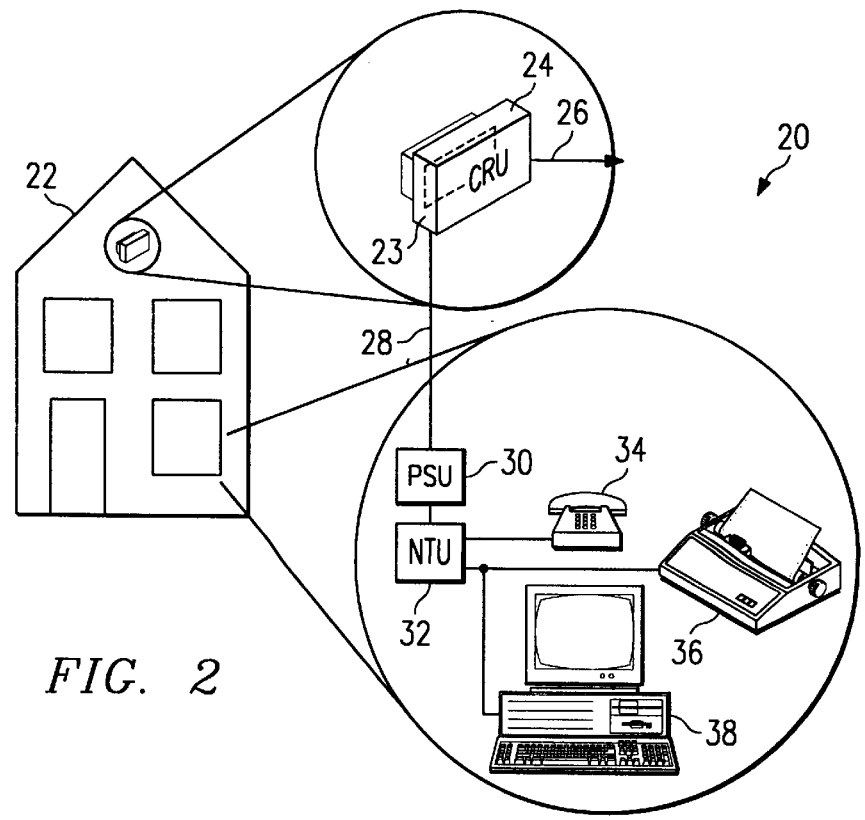
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 preferably supports either a single or a dual line, so that two subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figures 3, 3A:
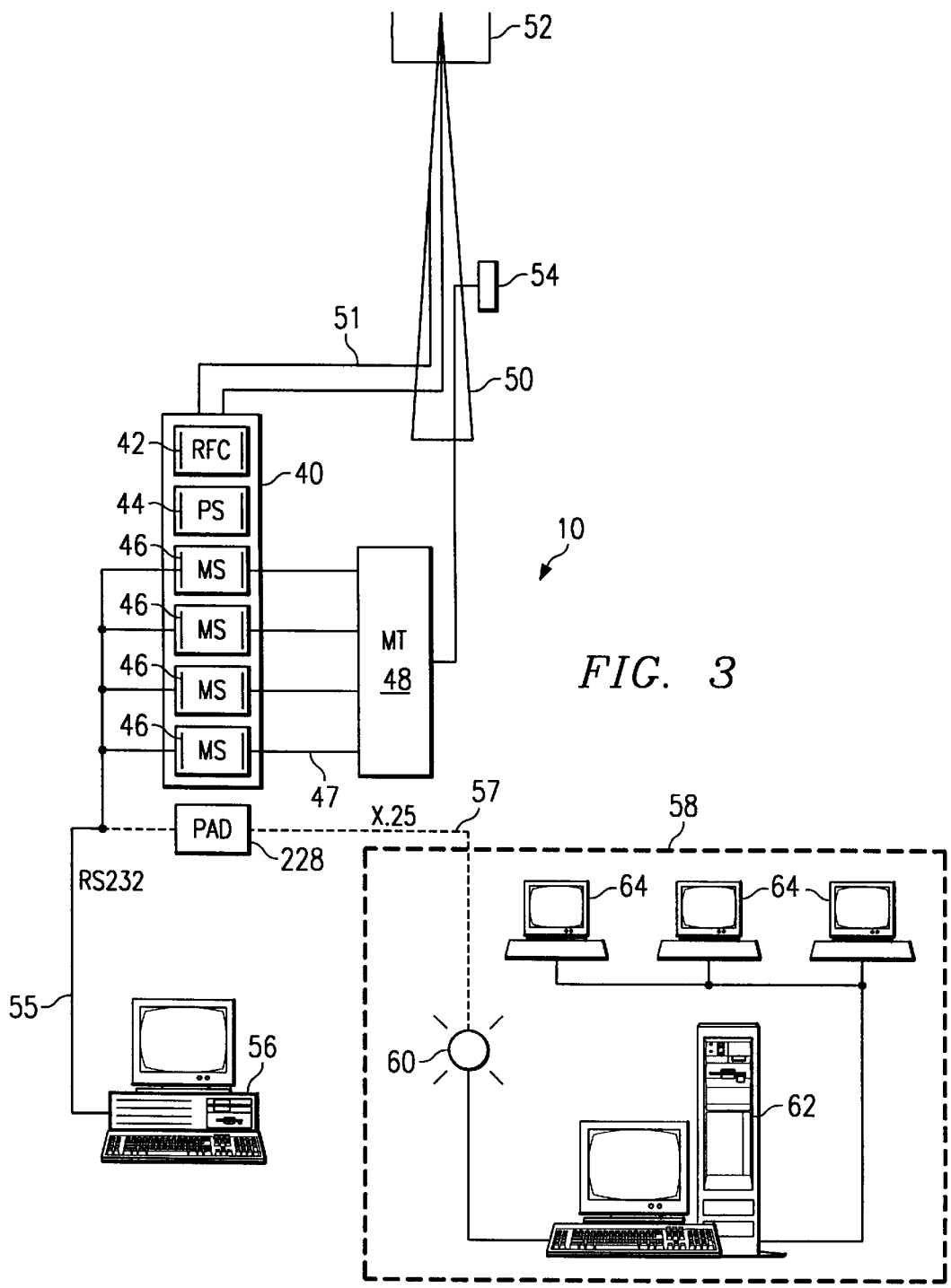
FIG. 3 is a schematic illustration of an example of a central terminal of the telecommunications system of FIG. 1.
FIG. 3A is a schematic illustration of a modem shelf of a central terminal of the telecommunications system of FIG. 1.

FIG. 3 is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the modem shelves 46 to operate in parallel. If 'n' modem shelves are provided, then the RF combiner shelf 42 combines and amplifies the power of 'n' transmit signals, each transmit signal being from a respective one of the 'n' modem shelves, and amplifies and splits received signals 'n' way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, such as an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 is based around a powerful workstation 62 and can include a number of computer terminals 64 for network engineers and control personnel.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This may include ½ rate convolution coding and ×16 spreading with "Code Division Multiplexed Access" (CDMA) codes on the transmit signals, and synchronisation recovery, de-spreading and error correction on the receive signals. Each modem card 70 in the present example has two modems, and in preferred embodiments there are eight modem cards per shelf, and so sixteen modems per shelf. However, in order to incorporate redundancy so that a modem may be substituted in a subscriber link when a fault occurs, only 15 modems on a single modem shelf 46 are generally used. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signalling of telephony information to the subscriber terminals via one of 15 of the 16 modems.

Figure 4:
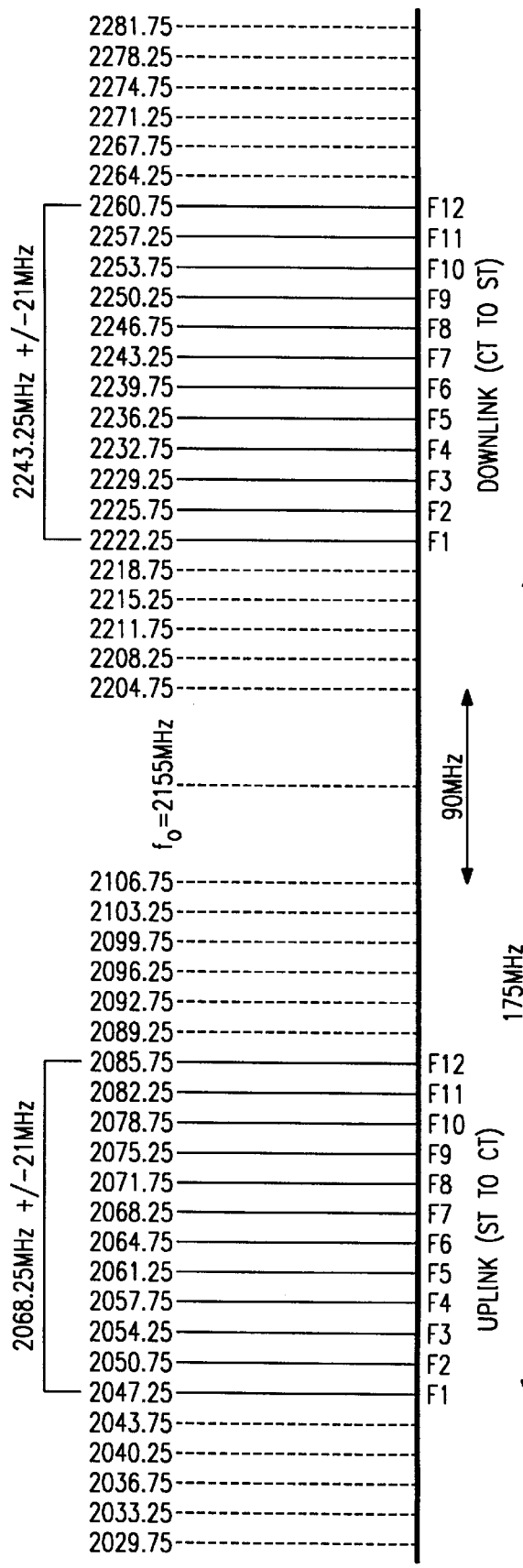
FIG. 4 is an illustration of an example of a frequency plan for the telecommunications system of FIG. 1.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, each modem shelf supports 1 frequency channel (i.e. one uplink frequency plus the corresponding downlink frequency). Currently, in a wireless telecommunications system as described above, CDMA encoding is used to support up to 15 subscriber links on one frequency channel (one subscriber link on each modem). Hence, if a central terminal has four modem shelves, it can support 60 (15×4) subscriber links (ie. 60 STs can be connected to one CT). However, it is becoming desirable for more than 60 STs to be supported from one central terminal, and, in preferred embodiments of the present invention, enhancements to the CDMA encoding technique are provided to increase the number of subscriber links that can be supported by a central terminal. Both CDMA encoding, and the enhancements made to the CDMA encoding in accordance with preferred embodiments, will be discussed in more detail later.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10.

FIG. 5A illustrates one cellular type arrangement of the frequencies to mitigate interference problems between adjacent central terminals 10. In the arrangement illustrated in FIG. 5A, the hatch lines for the cells 76 illustrate a frequency set (FS) for the cells. By selecting three frequency sets (e.g., where: FS1=F1, F4, F7, F10; FS2=F2, F5, F8, F11; FS3=F3, F6, F9, F12), and arranging that immediately adjacent cells do not use the same frequency set (see, for example, the arrangement shown in FIG. 5A), it is possible to provide an array of fixed assignment omnidirectional cells where interference between nearby cells can be reduced. The transmitter power of each central terminal 10 is preferably set such that transmissions do not extend as far as the nearest cell which is using the same frequency set. Thus, in accordance with the arrangement illustrated in FIG. 5A, each central terminal 10 can use the four frequency pairs (for the uplink and downlink, respectively) within its cell, each modem shelf in the central terminal 10 being associated with a respective RF channel (channel frequency pair).

Figure 5B illustrates a cellular type arrangement employing sectored cells to mitigate problems between adjacent central terminals 10. As with FIG. 5A, the different type of hatch lines in FIG. 5B illustrate different frequency sets. As in FIG. 5A, FIG. 5B represents three frequency sets (e.g., where: FS1=F1, F4, F7, F10; FS2=F2, F5, F8, F11; FS3=F3, F6, F9, F12) However, in FIG. 5B the cells are sectored by using a sectored central terminal (SCT) 13 which includes three central terminals 10, one for each sector S1, S2 and S3, with the transmissions for each of the three central terminals 10 being directed to the appropriate sector among S1, S2 and S3. This enables the number of subscribers per cell to be increased three fold, while still providing permanent fixed access for each subscriber terminal 20.

Arrangements such as those in FIGS. 5A and 5B can help reduce interference, but in order to ensure that cells operating on the same frequency don't inadvertently decode each others data, a seven cell repeat pattern is used such that for a cell operating on a given frequency, all six adjacent cells operating on the same frequency are allocated a unique pseudo random noise (PN) code. The use of PN codes will be discussed in more detail later. The use of different PN codes prevents nearby cells operating on the same frequency from inadvertently decoding each others data.

Figure 6:
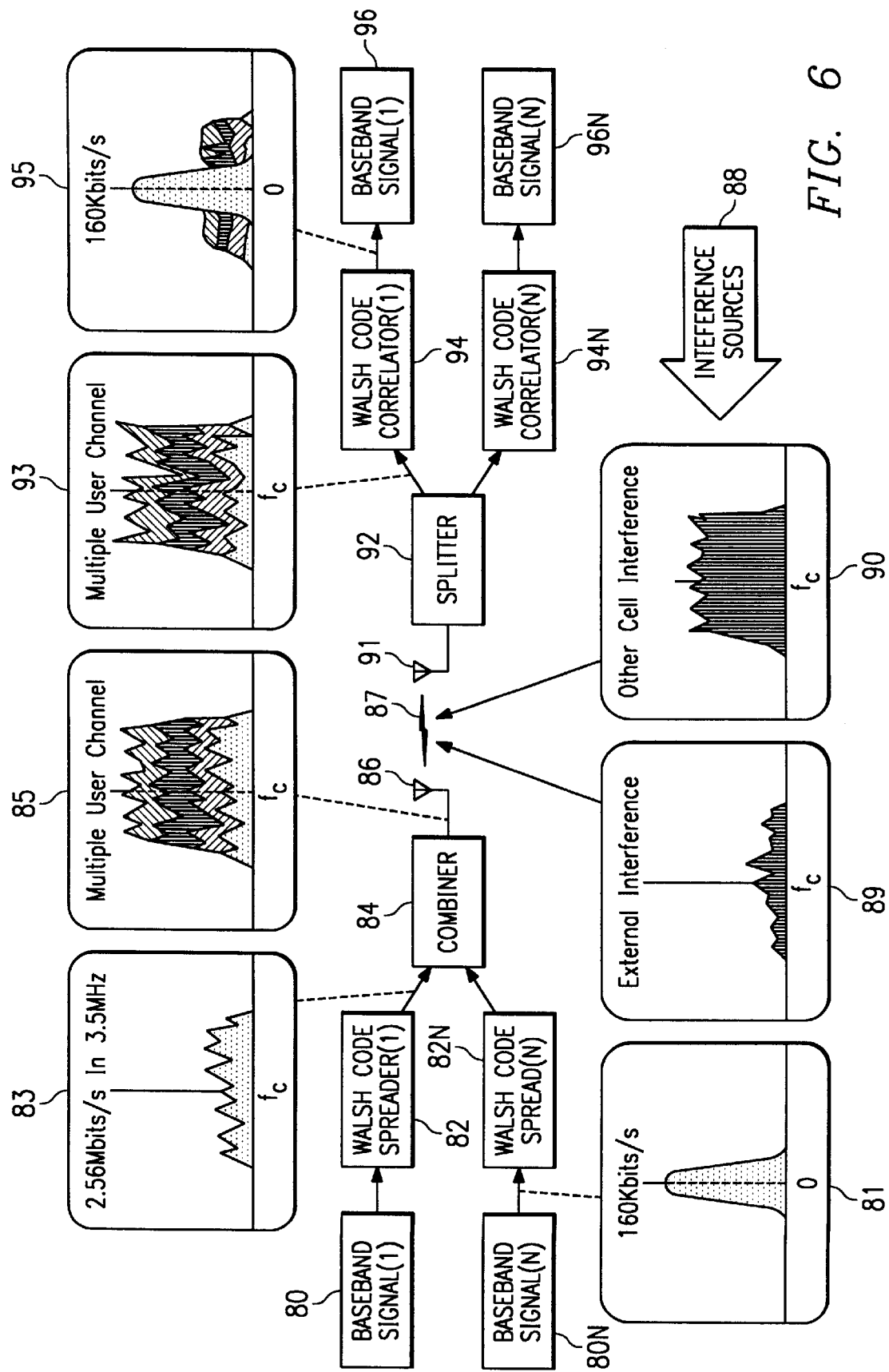
FIG. 6 is a schematic diagram illustrating aspects of a code division multiplex system for the telecommunications system of FIG. 1.

As mentioned above, CDMA techniques can be used in a fixed assignment arrangement (ie. one where each ST is assigned to a particular modem on a modem shelf) to enable each channel frequency to support 15 subscriber links. FIG. 6 gives a schematic overview of CDMA encoding and decoding.

In order to encode a CDMA signal, base band signals, for example the user signals for each respective subscriber link, are encoded at 80–80N into a 160 ksymbols/sec baseband signal where each symbol represents 2 data bits (see, for example the signal represented at 81). This signal is then spread by a factor of 16 using a spreading function 82–82N to generate signals at an effective chip rate of 2.56 Msymbols/sec in 3.5 MHz. The spreading function involves applying a PN code (that is specified on a per CT basis) to the signal, and also applying a Rademacher-Walsh (RW) code which ensures that the signals for respective subscriber terminals will be orthogonal to each other. Once this spreading function has been applied, the signals for respective subscriber links are then combined at step 84 and converted to radio frequency (RF) to give multiple user channel signals (e.g. 85) for transmission from the transmitting antenna 86.

During transmission, a transmitted signal will be subjected to interference sources 88, including external interference 89 and interference from other channels 90. Accordingly, by the time the CDMA signal is received at the receiving antenna 91, the multiple user channel signals may be distorted as is represented at 93.

In order to decode the signals for a given subscriber link from the received multiple user channel, a Walsh correlator 94–94N uses the same RW and PN codes that were used for the encoding for each subscriber link to extract a signal (e.g, as represented at 95) for the respective received baseband signal 96–96N. It will be noted that the received signal will include some residual noise. However, unwanted noise can be removed using a low pass filter and signal processing.

The key to CDMA is the application of the RW codes, these being a mathematical set of sequences that have the function of "orthonormality". In other words, if any RW code is multiplied by any other RW code, the results are zero. A set of 16 RW codes that may be used is illustrated in Table 1 below:

TABLE 1

| RW0  | 1 | 1  | 1  | 1  | 1  | 1  | 1  | 1  | 1  | 1  | 1  | 1  | 1  | 1  | 1  | 1  |
|------|---|----|----|----|----|----|----|----|----|----|----|----|----|----|----|----|
| RW1  | 1 | -1 | 1  | -1 | 1  | -1 | 1  | -1 | 1  | -1 | 1  | -1 | 1  | -1 | 1  | -1 |
| RW2  | 1 | 1  | -1 | -1 | 1  | 1  | -1 | -1 | 1  | 1  | -1 | -1 | 1  | 1  | -1 | -1 |
| RW3  | 1 | -1 | -1 | 1  | 1  | -1 | -1 | 1  | 1  | -1 | -1 | 1  | 1  | -1 | -1 | 1  |
| RW4  | 1 | 1  | 1  | 1  | -1 | -1 | -1 | -1 | 1  | 1  | 1  | 1  | -1 | -1 | -1 | -1 |
| RW5  | 1 | -1 | 1  | -1 | -1 | 1  | -1 | 1  | 1  | -1 | 1  | -1 | -1 | 1  | -1 | 1  |
| RW6  | 1 | 1  | -1 | -1 | -1 | -1 | 1  | 1  | 1  | 1  | -1 | -1 | -1 | -1 | 1  | 1  |
| RW7  | 1 | -1 | -1 | 1  | -1 | 1  | 1  | -1 | 1  | -1 | -1 | 1  | -1 | 1  | 1  | -1 |
| RW8  | 1 | 1  | 1  | 1  | 1  | 1  | 1  | 1  | -1 | -1 | -1 | -1 | -1 | -1 | -1 | -1 |
| RW9  | 1 | -1 | 1  | -1 | 1  | -1 | 1  | -1 | -1 | 1  | -1 | 1  | -1 | 1  | -1 | 1  |
| RW10 | 1 | 1  | -1 | -1 | 1  | 1  | -1 | -1 | -1 | -1 | 1  | 1  | -1 | -1 | 1  | 1  |
| RW11 | 1 | -1 | -1 | 1  | 1  | -1 | -1 | 1  | -1 | 1  | 1  | -1 | -1 | 1  | 1  | -1 |
| RW12 | 1 | 1  | 1  | 1  | -1 | -1 | -1 | -1 | -1 | -1 | -1 | -1 | 1  | 1  | 1  | 1  |
| RW13 | 1 | -1 | 1  | -1 | -1 | 1  | -1 | 1  | -1 | 1  | -1 | 1  | 1  | -1 | 1  | -1 |
| RW14 | 1 | 1  | -1 | -1 | -1 | -1 | 1  | 1  | -1 | -1 | 1  | 1  | 1  | 1  | -1 | -1 |
| RW15 | 1 | -1 | -1 | 1  | -1 | 1  | 1  | -1 | -1 | 1  | 1  | -1 | 1  | -1 | -1 | 1  |

The above set of RW codes are orthogonal codes that allow the multiple user signals to be transmitted and received on the same frequency at the same time. Once the bit stream is orthogonally isolated using the RW codes, the signals for respective subscriber links do not interfere with each other. Since RW codes are orthogonal, when perfectly aligned all codes have zero cross-correlation, thus making it possible to decode a signal while cancelling interference from users operating on other RW codes.

In preferred embodiments of the present invention, it is desired to provide the central terminal with the ability to support more than 15 subscriber links on each channel frequency, and to achieve this the above set of 16 RW codes has been enhanced. In order to maintain compatibility with former products using the 16 RW codes, it was desirable that any enhancements should retain the same set of 16 RW codes.

The manner in which the enhancements have been implemented provides flexibility in the way the frequency channels are configured, with certain configurations allowing a greater number of subscriber links to be supported, but at a lower gross bit rate. In preferred embodiments, a channel can be selected to operate with the following gross bit rates:

| | |
|---|---|
| 160 kb/s | Full rate (F1) |
| 80 kb/s | Half rate (H1, H2) |
| 40 kb/s | Quarter rate (Q1, Q2, Q3, Q4) |
| 10 kb/s | Low rate (L1, L2, L3, L4), for uplink acquisition |

In preferred embodiments, the manner in which these channelisations are provided differs for the downlink (CT to ST) and uplink (ST to CT) communication paths. This is because it has been realised that different performance requirements exist for the downlink and uplink paths. On the downlink all signals emanate from a single source, namely the central terminal, and hence the signals will be synchronised. However, on the uplink path, the signals will emanate from a number of independent STs, and hence the signals will not be synchronised.

Given the above considerations, in preferred embodiments, on the uplink path full rate (160 kb/s) operation is implemented using the basic set of RW codes discussed earlier, but half and quarter rates are achieved through the use of 'Overlay Codes' which comprise RW coded high rate symbol patterns that are transmitted for each intermediate rate data symbol. For half rate operation, two 2-bit overlay codes are provide, whilst for quarter rate operation, four 4-bit overlay codes are provided. WEn generating a signal for transmission, one of the overlay codes, where appropriate, is applied to the signal in addition to the appropriate RW code. When the signal is received, then at the CDMA demodulator the incoming signal is multiplied by the channel's PN, RW and Overlay codes. The correlator integration period is set to match the length of the Overlay code.

Overlay codes are used extensively to provide variable rate uplink traffic channels. Overlay codes will also be used to implement downlink control channels, these control channels being discussed in more detail later. However, as mentioned earlier, a different approach is taken for providing flexible channelisations on the downlink traffic channel paths. Downlink traffic channels will operate in high rate, 160 kb/s, mode, with lower data rates of 80 and 40 kb/s being supported by 'Time Division Multiplexing' (TDM) the available bandwidth.

In preferred embodiments, TDM timeslot bit numbering will follow the CCITT G. 732 convention with bits transmitted in the sequence bit 1, bit 2 . . . bit 8. Byte orientation is specified per channel as either most significant bit (MSB) first, least significant bit (LSB) first or N/A.

The provision of a hybrid CDMA/TDM approach for downlink traffic channels retains the benefits of CDMA access, ie. interference is reduced when traffic is reduced. Further, use of TDM ensures that the CDMA signal is limited to a 256 'Quadrature Amplitude Modulation' (QAM) constellation which reduces receiver dynamic range requirements. QAM constellations will be familiar to those skilled in the art.

On the uplink channels, the pure CDMA approach using overlay codes eliminates the need to time synchronise STs to a TDM frame reference. This has the advantage of eliminating TDM delays and the 'guard time' in between TDM frames. Another benefit is reduced peak power handling requirements in the ST RF transmit chain which would otherwise be needed when transmitting bursty TDM data. High dynamic range requirement is restricted to the CT receiver.

Figure 7A:
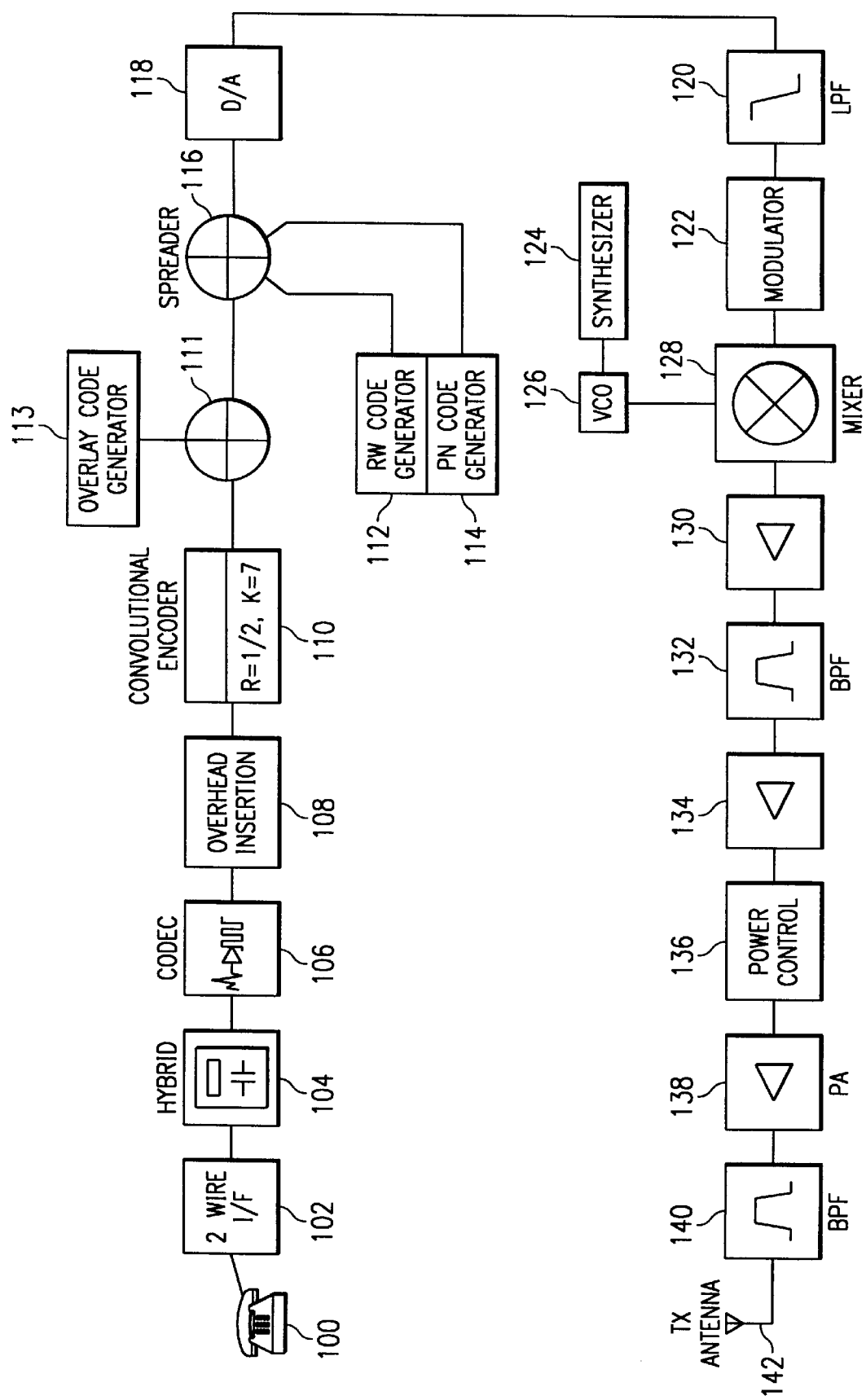
FIGS. 7A and 7B are schematic diagrams illustrating signal transmission processing stages for the telecommunications system of FIG. 1.

The manner in which the transmitted and received signals are processed in accordance with preferred embodiments of the present invention will be described with reference to FIGS. 7 and 8. FIG. 7A is a schematic diagram illustrating signal transmission processing stages as configured in a subscriber terminal 20 in the telecommunications system of FIG. 1. In FIG. 7A, an analogue signal from a telephone is passed via an interface such as two-wire interface 102 to a hybrid audio processing circuit 104 and then via a codec 106 to produce a digital signal into which an overhead channel including control information is inserted at 108. If the subscriber terminal supports a number of telephones or other telecommunications equipment, then elements 102, 104 and 106 may be repeated for each piece of telecommunications equipment.

At the output of overhead insertion circuit 108, the signal will have a bit rate of either 160, 80 or 40 kbits/s, depending on which channel has been selected for transmission of the signal.

The resulting signal is then processed by a convolutional encoder 110 to produce two signals with the same bit rate as the input signal (collectively, these signals will have a symbol rate of 160, 80 or 40 KS/s). Next, the signals are passed to a spreader 111 where, if a reduced bit rate channel has been selected, an appropriate overlay code provided by overlay code generator 113 is applied to the signals. At the output of the spreader 111, the signals will be at 160 KS/s irrespective of the bit rate of the input signal since the overlay code will have increased the symbol rate by the necessary amount.

The signals output from spreader 111 are passed to a spreader 116 where the Rademacher-Walsh and PN codes are applied to the signals by a RW code generator 112 and PN Code generator 114, respectively. The resulting signals, at 2.56 MC/s (2.56 Mega chips per second, where a chip is the smallest data element in a spread sequence) are passed via a digital to analogue converter 118. The digital to analogue converter 118 shapes the digital samples into an analogue waveform and provides a stage of baseband power control. The signals are then passed to a low pass filter 120 to be modulated in a modulator 122. The modulated signal from the modulator 122 is mixed with a signal generated by a voltage controlled oscillator 126 which is responsive to a synthesizer 160. The output of the mixer 128 is then amplified in a low noise amplifier 130 before being passed via a band pass filter 132. The output of the band pass filter 132 is further amplified in a further low noise amplifier 134, before being passed to power control circuitry 136. The output of the power control circuitry is further amplified in a power amplifier 138 before being passed via a further band pass filter 140 and transmitted from the transmission antenna 142.

Figure 7B:
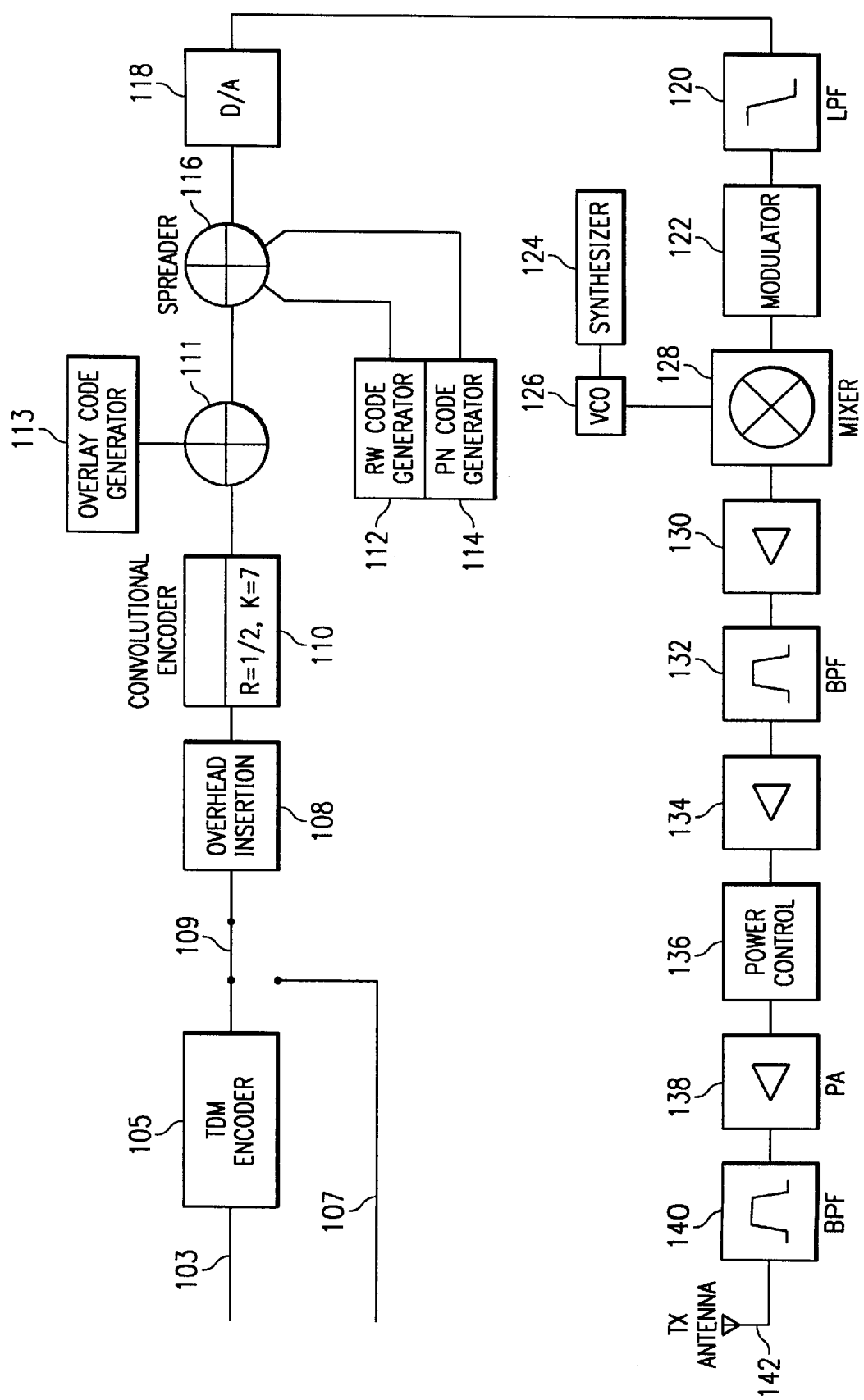

FIG. 7B is a schematic diagram illustrating signal transmission processing stages as configured in a central terminal 10 in the telecommunications system of FIG. 1. As will be apparent, the central terminal is configured to perform similar signal transmission processing to the subscriber terminal 20 illustrated in FIG. 7A, but does not include elements 100, 102, 104 and 106 associated with telecommunications equipment. Further, the central terminal includes a TDM encoder 105 for performing time division multiplexing where required. The central terminal will have a network interface over which incoming calls destined for a subscriber terminal are received. When an incoming call is received, the central terminal will contact the subscriber terminal to which the call is directed and arrange a suitable channel over which the incoming call can be established with the subscriber terminal (in preferred embodiments, this is done using the call control channel discussed in more detail later). The channel established for the call will determine the time slot to be used for call data passed from the CT to the ST and the TDM encoder 105 will be supplied with this information.

Hence, when incoming call data is passed from the network interface to the TDM encoder 105 over line 103, the TDM encoder will apply appropriate TDM encoding to enable the data to be inserted in the appropriate time slot. From then on, the processing of the signal is the same as the equivalent processing performed in the ST and described with reference to FIG. 7A, the overlay code generator producing a single overlay code of value '1' so that the signal output from spreader 111 is the same as the signal input to the spreader 111.

As mentioned earlier, in preferred embodiments, overlay codes, rather than TDM, are used to implement downlink control channels, and data relating to such channels is passed from a demand assignment engine (to be discussed in more detail later) over line 107 through switch 109 to the overhead insertion circuit 108, thereby bypassing the TDM encoder 105. The processing of the signal is then the same as the equivalent processing performed in the ST, with the overlay code generator providing appropriate overlay codes to the spreader 111. The overlay code generator will be controlled so as to produce the desired overlay code, in preferred embodiments, this control coming from the DA engine (to be discussed in more detail later).

Figure 8A:
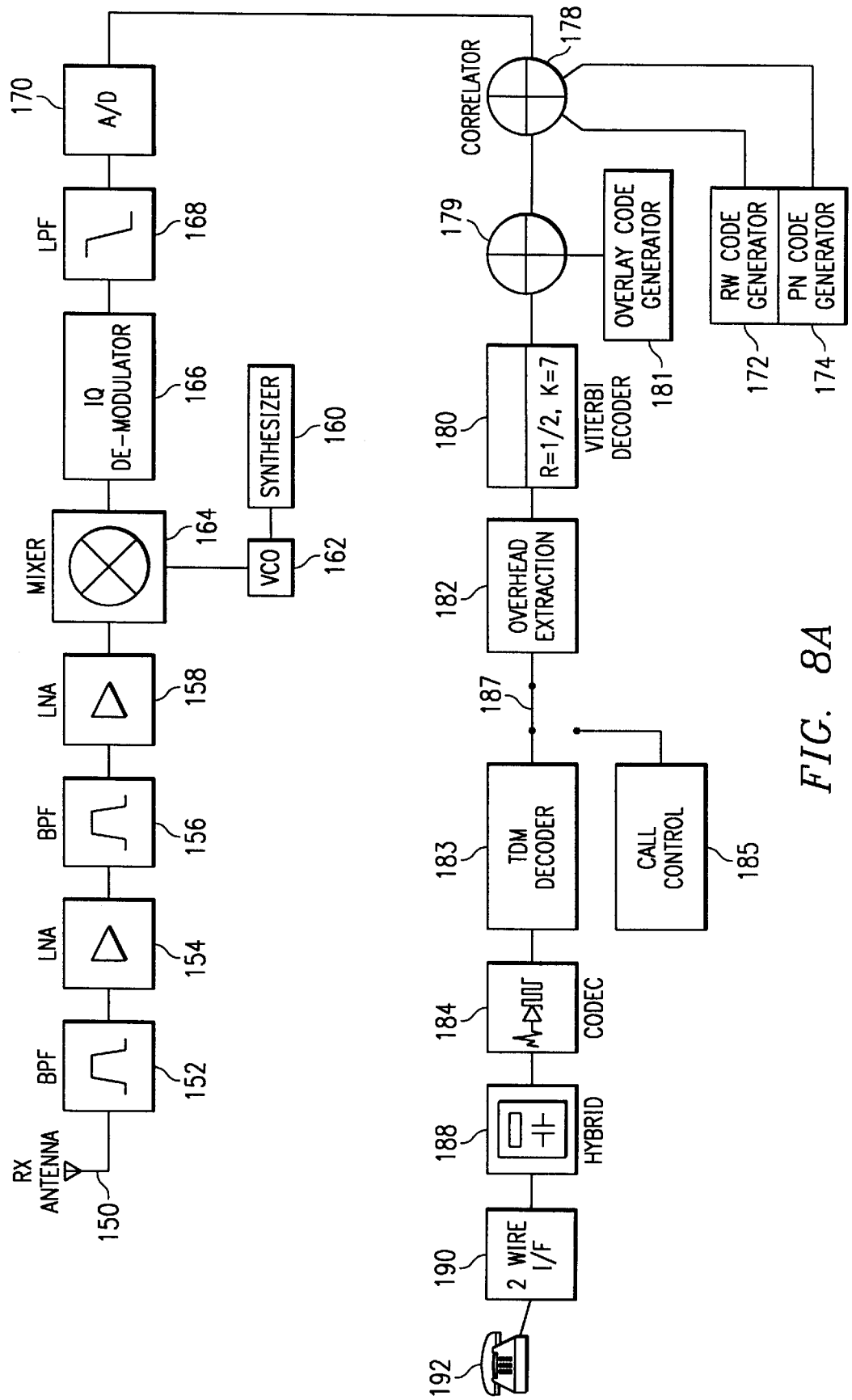
FIGS. 8A and 8B are schematic diagrams illustrating signal reception processing stages for the telecommunications system of FIG. 1.

FIG. 8A is a schematic diagram illustrating the signal reception processing stages as configured in a subscriber terminal 20 in the telecommunications system of FIG. 1. In FIG. 8A, signals received at a receiving antenna 150 are passed via a band pass filter 152 before being amplified in a low noise amplifier 154. The output of the amplifier 154 is then passed via a further band pass filter 156 before being further amplified by a further low noise amplifier 158. The output of the amplifier 158 is then passed to a mixer 164 where it is mixed with a signal generated by a voltage controlled oscillator 162 which is responsive to a synthesizer 160. The output of the mixer 164 is then passed via the I/Q de-modulator 166 and a low pass filter 168 before being passed to an analogue to digital converter 170. The digital output of the A/D converter 170 at 2.56 MC/s is then passed to a correlator 178, to which the same Rademacher-Walsh and PN codes used during transmission are applied by a RW code generator 172 (corresponding to the RW code generator 112) and a PN code generator 174 (corresponding to PN code generator 114), respectively. The output of the correlator 178, at 160 KS/s, is then applied to correlator 179, where any overlay code used at the transmission stage to encode the signal is applied to the signal by overlay code generator 181. The elements 170, 172, 174, 178, 179 and 181 form a CDMA demodulator. The output from the CDMA demodulator (at correlator 179) is then at a rate of either 160, 80 or 40 KS/s, depending on the overlay code applied by correlator 179.

The output from correlator 179 is then applied to a Viterbi decoder 180. The output of the Viterbi decoder 180 is then passed to an overhead extractor 182 for extracting the overhead channel information. If the signal relates to call data, then the output of the overhead extractor 182 is then passed through TDM decoder 183 to extract the call data from the particular time slot in which it was inserted by the CT TDM encoder 105. Then, the call data is passed via a codec 184 and a hybrid circuit 188 to an interface such as two wire interface 190, where the resulting analogue signals are passed to a telephone 192. As mentioned earlier in connection with the ST transmission processing stages, elements 184, 188, 190 may be repeated for each piece of telecommunications equipment 192 at the ST.

If the data output by the overhead extraction circuit 182 is data on a downlink control channels, then instead of passing that data to a piece of telecommunications equipment, it is passed via switch 187 to a call control logic 185, where that data is interpreted by the ST.

At the subscriber terminal 20, a stage of automatic gain control is incorporated at the IF stage. The control signal is derived from the digital portion of the CDMA receiver using the output of a signal quality estimator.

Figure 8B:
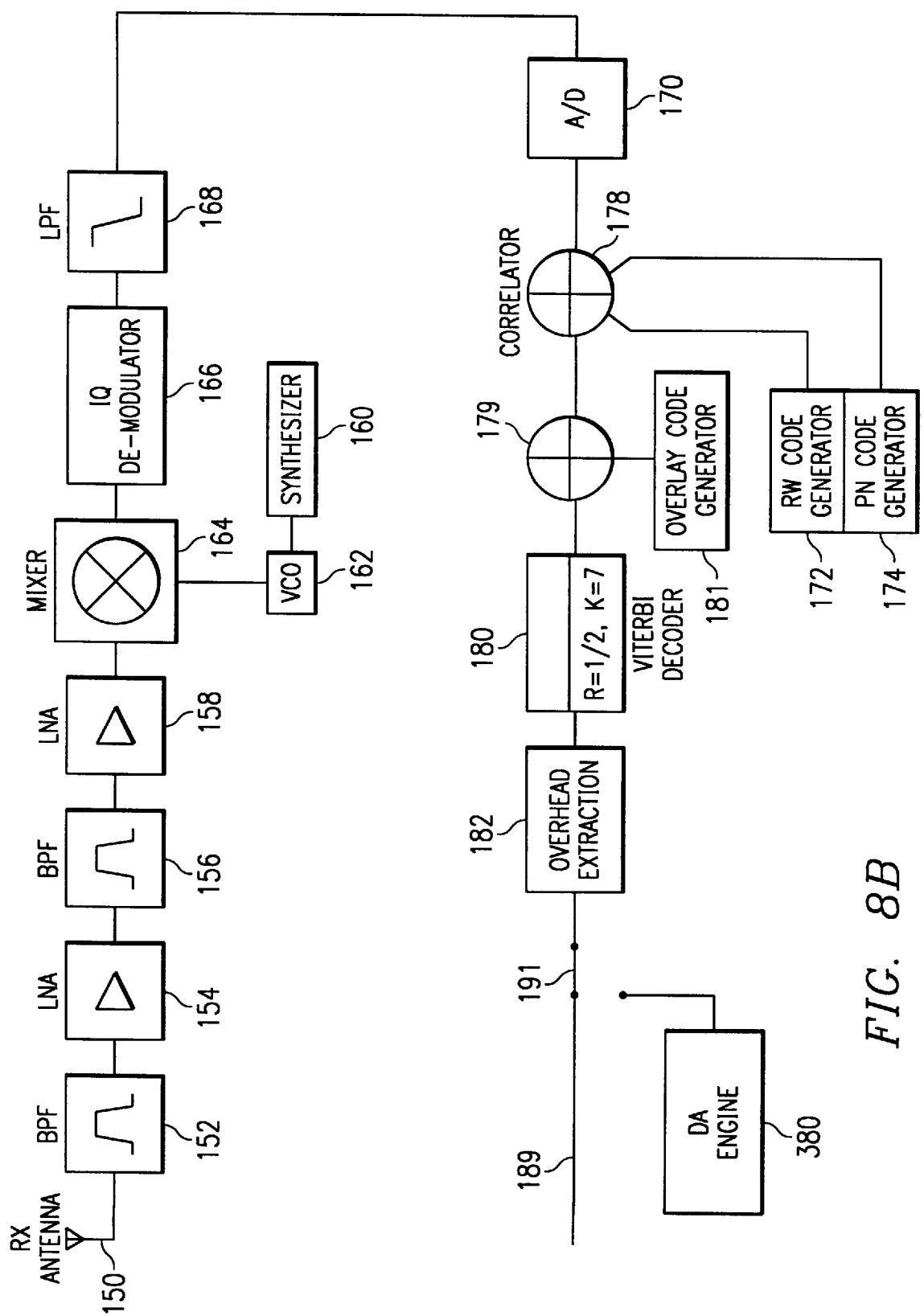

FIG. 8B illustrates the signal reception processing stages as configured in a central terminal 10 in the telecommunications system of FIG. 1. As will be apparent from the figure, the signal processing stages between the RX antenna 150 and the overhead extraction circuit 182 are the as those within the ST discussed in connection with FIG. 8A. However, in the case of the CT, call data output from the overhead extraction circuit is passed over line 189 to the network interface within the CT, whilst control channel data is passed via switch 191 to the DA engine 380 for processing. The DA engine is discussed in more detail later.

Overlay codes and channelisation plans are selected to ensure signal orthogonality—i.e. in a properly synchronised system, the contribution of all channels except the channel being demodulated sum to zero over the correlator integration period. Further, uplink power is controlled to maintain constant energy per bit. The exception to this is Low rate which will be transmitted at the same power as a Quarter rate signal. Table 2 below illustrates the overlay codes used for full, half and quarter rate operations:

TABLE 2

| Net Rate (kb/s) | Channel designation | ST Tx. power relative to F1-U (dB) | Overlay Code | Correlator integration period (us) | Acquisition overlay |
| --- | --- | --- | --- | --- | --- |
| 160 | –F1-U | 0 | 1 | 6.25 | L1 |
| 80 | –H1-U | –3 | 1  1 | 12.5 | L1 |
| 80 | –H2-U | –3 | 1 –1 | 12.5 | L3 |
| 40 | –Q1-U | –6 | 1  1  1  1 | 25 | L1 |
| 40 | –Q2-U | –6 | 1 –1  1 –1 | 25 | L2 |
| 40 | –Q3-U | –6 | 1  1 –1 –1 | 25 | L3 |
| 40 | –Q4-U | –6 | 1 –1 –1  1 | 25 | L4 |

In preferred embodiments, a 10 kb/s acquisition mode is provided which uses concatenated overlays to form an acquisition overlay; this is illustrated in table 3 below:

TABLE 3

| Acquisition overlay | Equivalent high rate pattern |
|---|---|
| L1-U | 1  1  1  1  1  1  1  1  1  1  1  1  1  1  1  1 |
| L2-U | 1  1 -1 -1  1  1 -1 -1  1  1 -1 -1  1  1 -1 -1 |
| L3-U | 1 -1  1 -1  1 -1  1 -1  1 -1  1 -1  1 -1  1 -1 |
| L4-U | 1 -1 -1  1  1 -1 -1  1  1 -1 -1  1  1 -1 -1  1 |

Figure 9A:
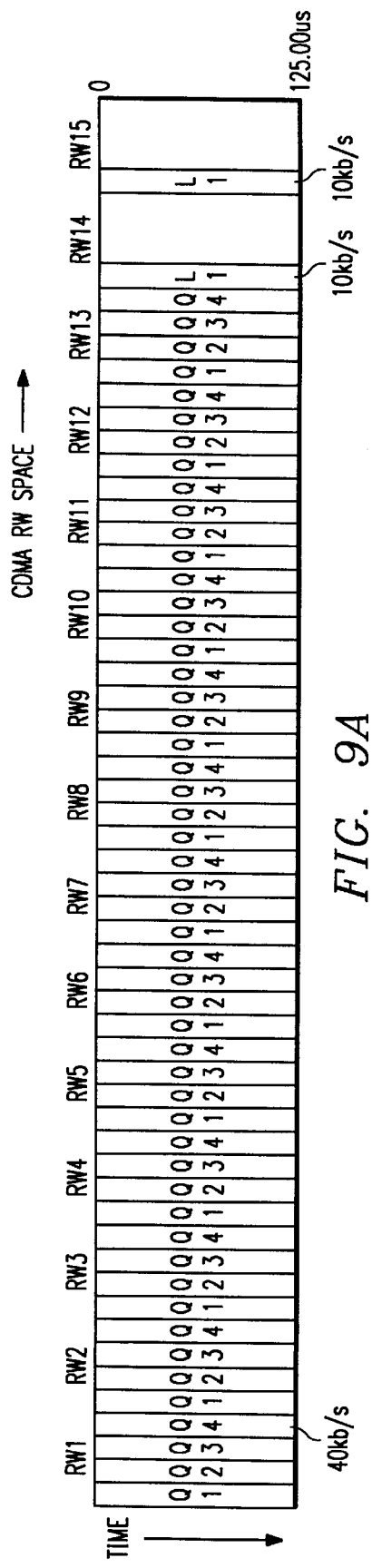
FIGS. 9A and 9B are diagrams illustrating the uplink and downlink delivery methods when the system is fully loaded.
Figure 9B:
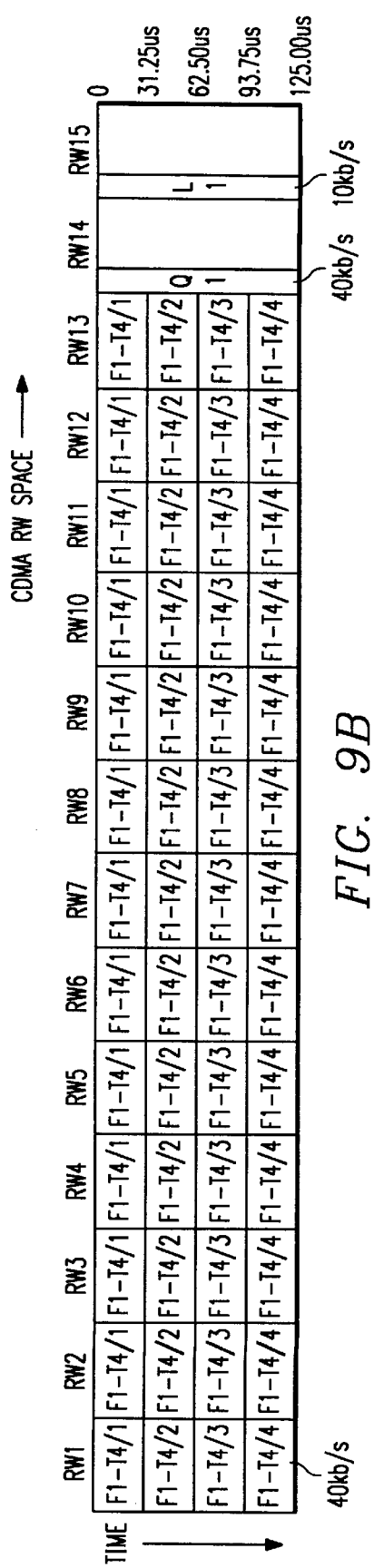

FIGS. 9A and 9B are diagrams illustrating the uplink and downlink delivery methods, respectively, when the system is fully loaded, and illustrate the difference between the use of overlay codes illustrated in FIG. 9A and the use of TDM as illustrated in FIG. 9B. When using overlay codes, an RW code is split in the RW space domain to allow up to four sub channels to operate at the same time. In contrast, when using TDM, an RW code is split in the time domain, to allow up to four signals to be sent using one RW code, but at different times during the 125 us frame. As illustrated in FIGS. 9A and 9B, the last two RW codes, RW14 and RW15, are not used for data traffic in preferred embodiments, since they are reserved for call control and acquisition functions; this will be discussed in more detail later.

Figure 10:
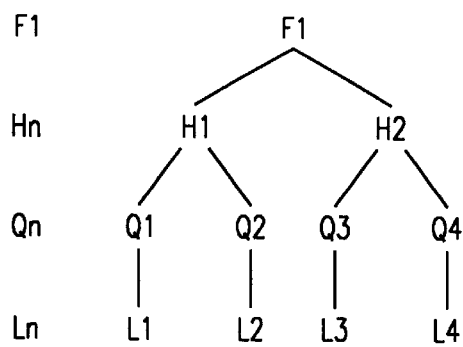
FIG. 10 illustrates the CDMA channel hierarchy in accordance with preferred embodiments of the present invention.

The CDMA channel hierarchy is as illustrated in FIG. 10. Using this hierarchy, the following CDMA channelisations are possible:

F1
H1+H2
H1+Q3+Q4
H2+Q1+Q2
Q1+Q2+Q3+Q4

Figure 11:
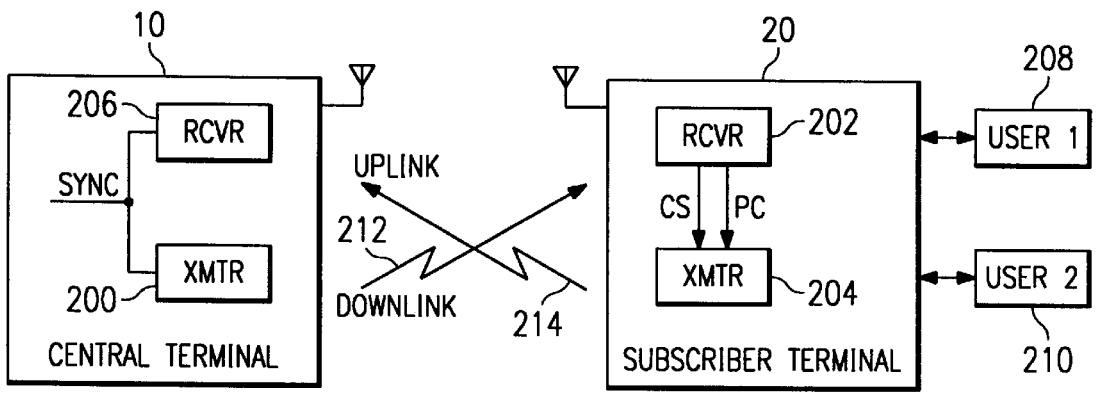
FIG. 11 is a schematic diagram illustrating downlink and uplink communication paths for the wireless telecommunications system.
Figure 12:
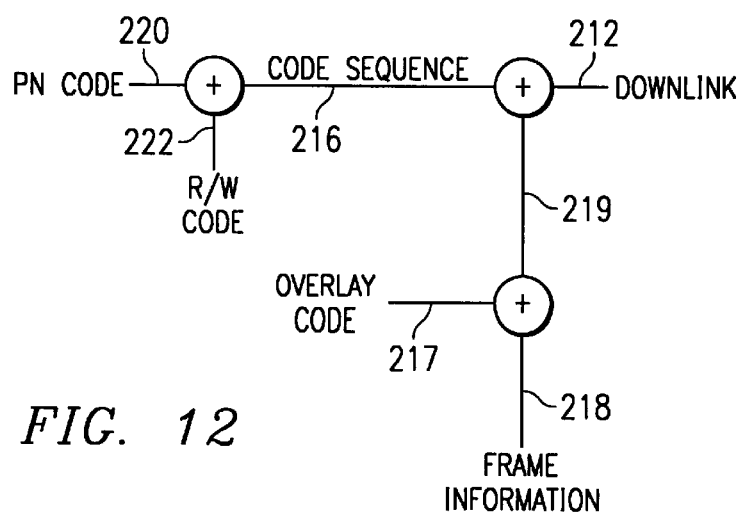
FIG. 12 is a schematic diagram illustrating the makeup of a downlink signal transmitted by the central terminal.

Having discussed how the CDMA codes are enhanced to enable flexible channelisations to be achieved, whereby the bit rates can be lowered to enable more subscriber links to be managed per channel frequency, a general overview of how the downlink and uplink paths are established will be provided with reference to FIGS. 11 and 12.

FIG. 11 is a block diagram of downlink and uplink communication paths between central terminal 10 and subscriber terminal 20. A downlink communication path is established from transmitter 200 in central terminal 10 to receiver 202 in subscriber terminal 20. An uplink communication path is established from transmitter 204 in subscriber terminal 20 to receiver 206 in central terminal 10. Once the downlink and the uplink communication paths have been established in wireless telecommunication system 1, telephone communication may occur between a user 208, 210 of subscriber terminal 20 and a user serviced through central terminal 10 over a downlink signal 212 and an uplink signal 214. Downlink signal 212 is transmitted by transmitter 200 of central terminal 10 and received by receiver 202 of subscriber terminal 20. Uplink signal 214 is transmitted by transmitter 204 of subscriber terminal 20 and received by receiver 206 of central terminal 10.

Receiver 206 and transmitter 200 within central terminal 10 are synchronized to each other with respect to time and phase, and aligned as to information boundaries. In order to establish the downlink communication path, receiver 202 in subscriber terminal 20 should be synchronized to transmitter 200 in central terminal 10. Synchronization occurs by performing an acquisition mode function and a tracking mode function on downlink signal 212. Initially, transmitter 200 of central terminal 10 transmits downlink signal 212. FIG. 12 shows the contents of downlink signal 212. A frame information signal 218 is combined with an overlay code 217 where appropriate, and the resultant signal 219 is combined with a code sequence signal 216 for central terminal 10 to produce the downlink 212. Code sequence signal 216 is derived from a combination of a pseudo-random noise code signal 220 and a Rademacher-Walsh code signal 222.

Downlink signal 212 is received at receiver 202 of subscriber terminal 20. Receiver 202 compares its phase and code sequence to a phase and code sequence within code sequence signal 216 of downlink signal 212. Central terminal 10 is considered to have a master code sequence and subscriber terminal 20 is considered to have a slave code sequence. Receiver 202 incrementally adjusts the phase of its slave code sequence to recognize a match to master code sequence and place receiver 202 of subscriber terminal 20 in phase with transmitter 200 of central terminal 10. The slave code sequence of receiver 202 is not initially synchronized to the master code sequence of transmitter 200 and central terminal 10 due to the path delay between central terminal 10 and subscriber terminal 20. This path delay is caused by the geographical separation between subscriber terminal 20 and central terminal 10 and other environmental and technical factors affecting wireless transmission.

After acquiring and initiating tracking on the central terminal 10 master code sequence of code sequence signal 216 within downlink signal 212, receiver 202 enters a frame alignment mode in order to establish the downlink communication path. Receiver 202 analyzes frame information within frame information signal 218 of downlink signal 212 to identify a beginning of frame position for downlink signal 212. Since receiver 202 does not know at what point in the data stream of downlink signal 212 it has received information, receiver 202 must search for the beginning of frame position in order to be able to process information received from transmitter 200 of central terminal 10. Once receiver 202 has identified one further beginning of frame position, the downlink communication path has been established from transmitter 200 of central terminal 10 to receiver 202 of subscriber terminal 20.

Figure 13A:
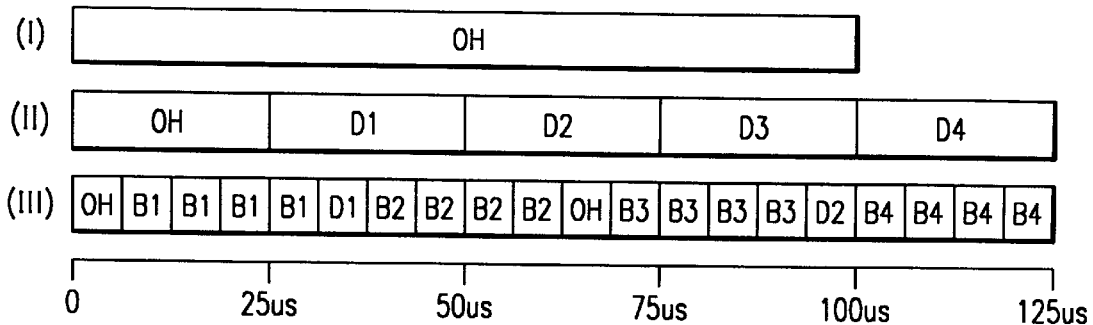
FIGS. 13A and 13B illustrate the structure of the frames of information sent over the downlink and uplink paths.
Figure 13B:
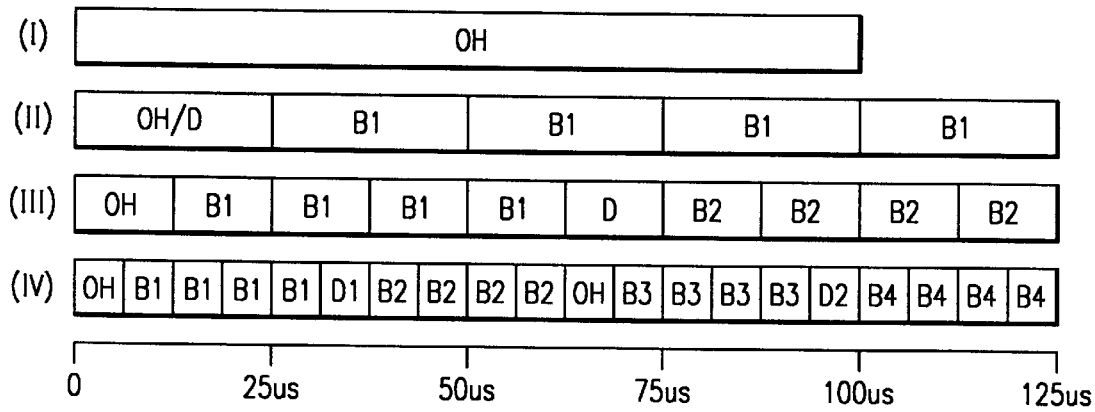

The structure of the radio frames of information sent over the downlink and uplink paths will now be discussed with reference to FIGS. 13 and 14. In FIGS. 13 and 14, the following terms are used:

Bn Customer payload, 1×32 to 2×64 Kb/s
Dn Signalling Channel, 2 to 16 kb/s
OH Radio Overhead Channel
   16 kb/s Traffic Mode
   10 kb/s Acquisition/Standby Mode Both FIGS. 13A and 13B show a 125 us subframe format, which is repeated throughout an entire radio frame, a frame typically lasting for 4 milliseconds (ms). FIG. 13A illustrates the radio frame structures that are used in preferred embodiments for the downlink path. Subframe (i) in FIG. 13A shows the radio frame structure used for low rate, 10 Kb/s, acquisition mode (Ln-D) during which only the overhead channel is transmitted. Subframe (ii) in FIG. 13A shows the radio frame structure employed for the call control channel operating in quarter rate, 40 Kb/s, mode (Qn-D), whilst subframe (iii) of FIG. 13A illustrates the radio frame structure used for traffic channels operating in full rate, 160 kb/s, mode (F1-D).

Similarly, subframe (i) of FIG. 13B shows the radio frame structure used for the uplink path when operating in low rate acquisition or call control mode (Ln-U). Sub-frames (ii) to (iv) show the radio frame structure used for traffic channels when operating in quarter rate mode (Qn-U), half rate mode (Hn-U), and full rate mode (Fl-U), respectively.

Figure 14A:
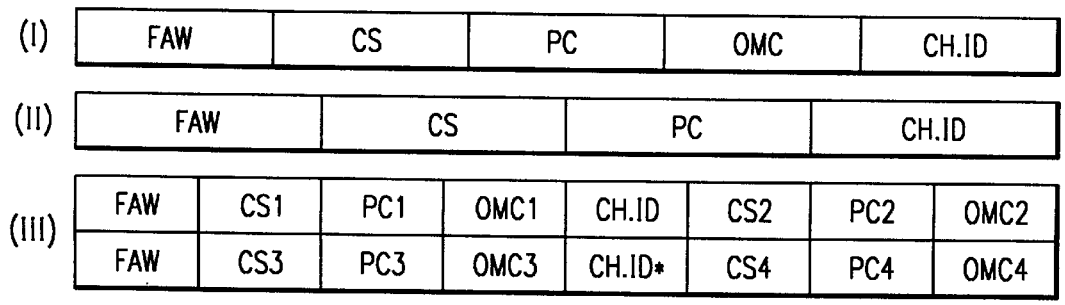
FIGS. 14A and 14B illustrate the overhead frame structure for the downlink and uplink paths.
Figure 14B:
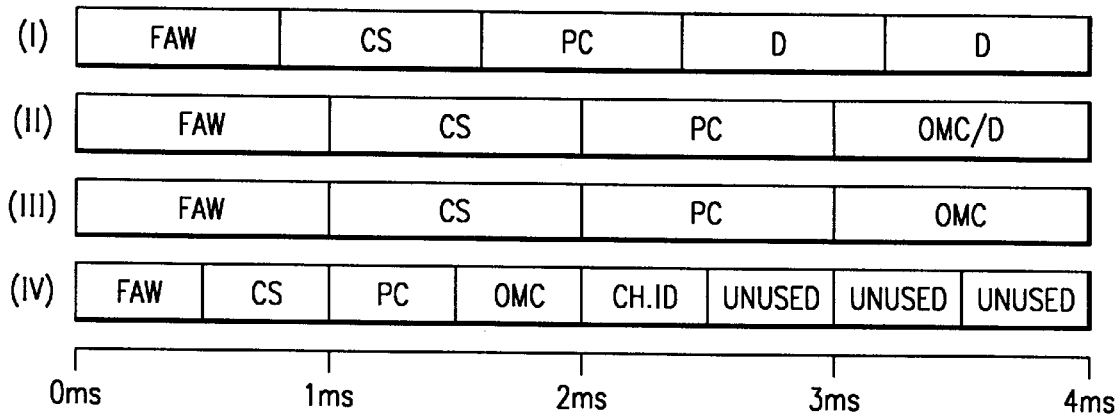

Considering now the overhead channel in more detail, FIGS. 14A and 14B show the overhead frame structure employed for various data rates. The overhead channel may include a number of fields—a frame alignment word (FAW), a code synchronization signal (CS), a power control signal (PC), an operations and maintenance channel signal (OMC), a mixed OMC/D-Channel (HDLC) signal (OMC/D), a channel identifier byte (Ch.ID), and some unused fields.

The frame alignment word identifies the beginning of frame position for its corresponding frame of information. The code synchronization signal provides information to control synchronization of transmitter 204 in subscriber terminal 20 to receiver 206 in central terminal 10. The power control signal provides information to control transmitting power of transmitter 204 in subscriber terminal 20. The operations and maintenance channel signal provides status information with respect to the downlink and uplink communication paths and a path from the central terminal to the subscriber terminal on which the communication protocol which operates on the modem shelf between the shelf controller and the modem cards also extends. The OMC/D signal is a combination of the OMC signal and a signalling signal (D), whilst the Ch. ID signal is used to uniquely identify an RW channel, this Ch. ID signal being used by the subscriber terminal to ensure that the correct channel has been acquired.

In preferred embodiments, the subscriber terminal will receive downlink traffic channel data at a rate of 160 kb/s. Depending on the B-channel rate, the ST will be allocated an appropriate share of the radio overhead. The following TDM mappings are created:

TABLE 4

| Rate (kb/s) | Channel designation | Bearer | CS | PC | OMC | Overhead rate |
| --- | --- | --- | --- | --- | --- | --- |
| 160 | –F1–D–T1/1 | B1, B2, B3, B4 | CS1, CS3 | PC1, PC3 | OMC1, OMC3 | 4 ms |
| 80 | –F1–D–T2/1 | B1, B2 | CS1, CS3 | PC1, PC3 | OMC1, OMC3 | 4 ms |
| 80 | –F1–D–T2/2 | B3, B4 | CS2, CS4 | PC2, PC4 | OMC2, OMC4 | 4 ms |
| 40 | –F1–D–T4/1 | B1 | CS1 | PC1 | OMC1 | 8 ms |
| 40 | –F1–D–T4/2 | B2 | CS2 | PC2 | OMC2 | 8 ms |
| 40 | –F1–D–T4/3 | B3 | CS3 | PC3 | OMC3 | 8 ms |
| 40 | –F1–D–T4/4 | B4 | CS4 | PC4 | OMC4 | 8 ms |

In the above chart, the scheme used to identify a channel is as follows. Rate code 'F1' indicates full rate, 160 kb/s, 'D' indicates that the channel is a downlink channel, and 'Tn/t' indicates that the channel is time division multiplexed between STs, 'n' indicating the total number of TDM timeslots, and 't' indicating the selected traffic timeslot.

All ST's operating on a traffic channel will receive D-channel information at the 16 kb/s rate. The D-channel protocol includes an address field to specify which ST is to process the contents of the message.

Figure 15A:
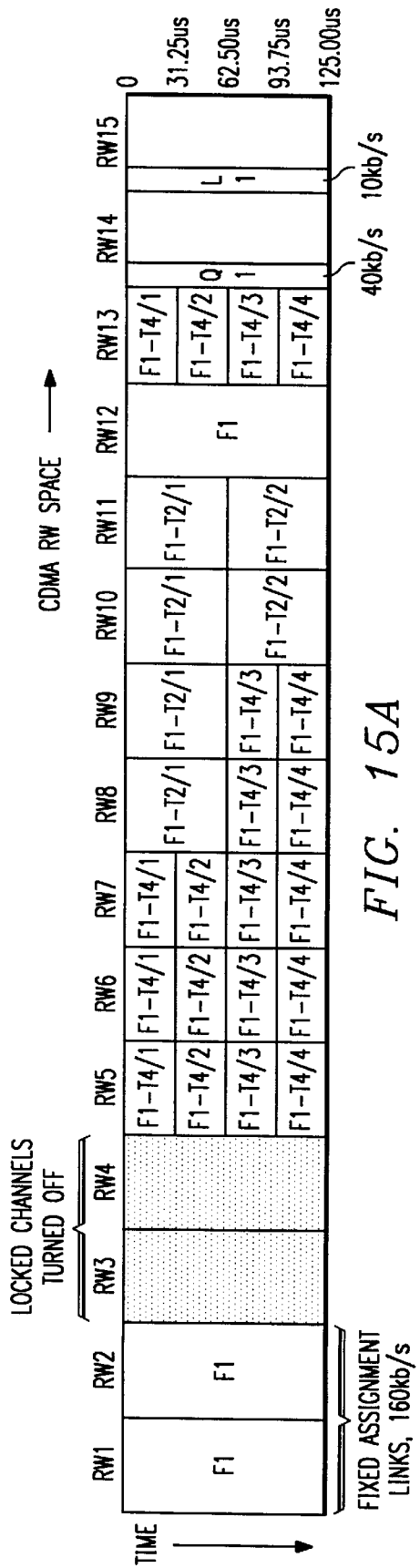
FIGS. 15A and 15B illustrate typical downlink and uplink channel structures that might occur in a loaded system in accordance with preferred embodiments of the present invention.
Figure 15B:
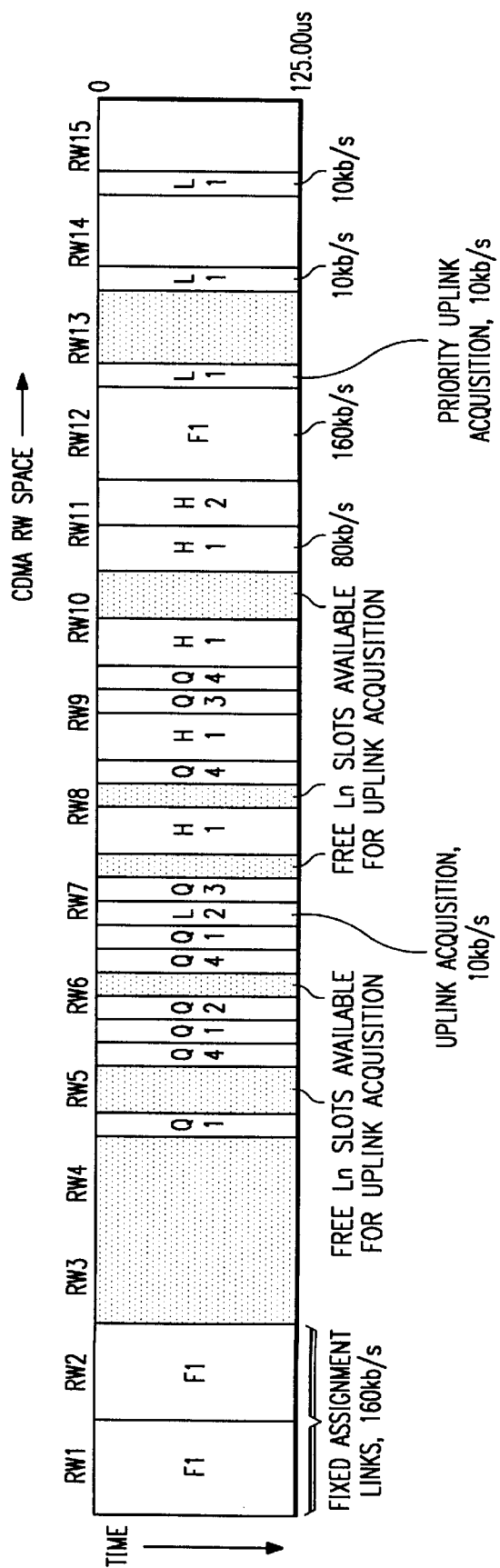

The channel structure was illustrated earlier in FIGS. 9A and 9B. In preferred embodiments, the channel structure is flexible but comprises:

At least one Link Acquisition Channel (LAC)
At least one Call Control Channel (CCC)
Typically one Priority Traffic Channels (PTC)
1 to 13 Traffic Channels (TC) The manner in which the channelisation is provided ensures that former fixed assignment arrangements using the set of 16 RW codes discussed earlier are still supported, as well as demand access services that are available when using a system in accordance with the preferred embodiment. FIGS. 15A and 15B illustrate typical downlink and uplink channel structures that might occur in a loaded system in accordance with preferred embodiments of the present invention. As illustrated in FIG. 15A, on the downlink path, some signals may be at 160 kb/s and utilise an entire RW channel. An example of such signals would be those sent over fixed assignment links to products which do not support the CDMA enhancements provided by systems in accordance with preferred embodiments of the present invention, as illustrated for RW1 and RW2 in FIG. 15A. Alternatively, a user may have authority to utilise a whole RW channel, for example when sending a fax, as illustrated by RW12 in FIG. 15A.

As illustrated by RW5 to RW11, TDM can be used on the downlink traffic channels to enable more than one CT to ST communication to take place on the same RW channel during each frame. Further, as illustrated for RW3 and RW4, in preferred embodiments, certain channels can be locked to limit interference from other nearby cells, as will be discussed in more detail later.

Similar channelisations can be achieved for the uplink paths, but as illustrated in FIG. 15B, overlay codes are used instead of TDM to enable more than one ST to CT communication to take place on the same RW channel during each frame (as shown in FIG. 15B for RW5 to RW11). It should be noted that, in both FIGS. 15A and 15B, the channels RW14 and RW15 are reserved as a call control channel and an link acquisition channel, respectively, and overlay codes are employed on these channels, irrespective of whether the path is a downlink or an uplink path. These two channels will be discussed in more detail below.

Acquisition/net entry will take place via the Link Acquisition Channel (LAC). Following power-up an ST will automatically attempt downlink acquisition of the LAC on a pre-determined 'home' RF channel. The LAC downlink channel (eg. RW15 in preferred embodiments) will operate at 10 kb/s, full single user power. Downlink acquisition will be simultaneous for all STs.

Each CT Modem Shelf will maintain a database holding the serial numbers of all STs that could possibly be supported by that CT. The state of each ST will recorded with top level states as follows:

cold
idle
call_in_progress

Transition states will also be defined. An ST is considered cold if the ST is newly provisioned, the CT has lost management communications with the ST or the CT has been power cycled. Over the LAC, the CT broadcasts individual ST serial numbers and offers an invitation to acquire the LAC uplink. Cold uplink acquisition will be carried out on the Link Acquisition Channel at low rate. The CT will invite specific ST's to cold start via the management channel.

Assuming an uplink channel is available, the appropriate acquisition overlay will be selected, and acquisition will be initiated.

'Rapid' downlink RW channel switching may be supported at rates other than Ln-D. Rapid means that coherent demodulation is maintained, and only convolutional decoding and frame synchronisation processes need be repeated.

On acquisition, management information will be exchanged. The ST will be authenticated and allocated a short ST_identifier (between 12 and 16 bits) which will be used for subsequent addressing. The ST uplink will operate for long enough for the uplink to be parametised by the ST in terms of code phase and transmit power. These parameters will be used by the ST for subsequent warm start acquisitions and will also be held by the CT to allow the CT to force a cold ST to warm start. On successful completion of net entry, the ST will be placed in the idle state and instructed to cease uplink communications and move to the Call Control Channel (CCC) (RW14 in preferred embodiments).

The time taken for net entry to be achieved can be monitored, and the following techniques can be used to decrease net entry time if desired:

(i) Prioritise so that high GOS (Grade Of Service) users are offered net entry first.

(ii) Convert Traffic Channels to LACs.

(iii) In the event of a CT restart, invite STs to attempt uplink warm start. A reduction in net entry time of a factor of 4 could be achieved. This mechanism would need to be safeguarded against possible deterioration of uplink warm start parameters—i.e. it should only be allowed provided no CT RF related parameters have been modified. The CT would need to broadcast an ID to allow an ST to validate that the uplink warm start parameters were valid for this CT.

(iv) ST restart—the CT will keep copies of the ST warm start parameters so that a cold ST may have warm start parameters downloaded in the invitation to acquire and then be instructed to warm start.

Following Net Entry, all STs listen to the CCC. This channel broadcasts management and call control information via a 32 kb/s HDLC channel. In order to maintain management communication, the CT polls each ST in sequence. Each poll comprises a broadcast invitation for an addressed ST to acquire the CCC Uplink followed by an exchange of management information (authentication, ST alarm update, warm start parameters, downlink radio performance data etc).

A Management Poll may fail for one of the following reasons:

(i) The ST is or has been powered down. An EM alarm may be flagged if this persists and the database for that ST should be marked cold. The Net Entry process will follow.

(ii) The ST is either making a call or in the process of making a call. The poll cycle may be suspended and management communications effected on the appropriate traffic channel.

When a Management Poll fails it should be followed up by a number of faster polls until either the ST responds or it is marked cold. The CCC is required to transmit all copies of the invitations to acquire the LAC so that an ST can be forced to acquire the LAC uplink.

Traffic Channel Uplink Acquisition Procedure

The basic acquisition process from the ST side is as follows;

(i) Switch the downlink (receiver) circuitry to 10 kb/s rate, and select the appropriate Traffic Channel RW and Overlay codes. Acquisition of the TC downlink is limited to achieving frame alignment.

(ii) The downlink PC/CS channel will be decoded to create a busy/idle flag. If PC/CS reports busy, then this means that another ST is using that traffic channel and the ST aborts the acquisition process.

(iii) Switch uplink to 10 kb/s rate, and select the appropriate Traffic Channel RW and Overlay codes.

Enable the ST transmitter at a level of nominal full rate power minus 18 dB. While PC/CS reports idle the ST will continue uplink fast codesearch, stepping the uplink power level by +2 dB at the end of each search. The uplink should acquire at nominal full rate power minus 6 dB. Uplink acquisition is aborted if maximum transmit level is reached and PC/CS continues to report idle.

(iv) PC/CS reports busy. At this point the ST may have genuinely acquired the traffic channel, or instead may be observing PC/CS go busy because another ST has acquired the traffic channel. The ST is sent an authentication request and responds with it's ST_identifer. The CT grants uplink access by returning the ST_identifier. The ST aborts the acquisition process if the returned ST_identifier is not recognised (ie. is not the ST_identifer that it sent). This authentication process arbitrates between two STs contending for outgoing access and it also keeps STs from acquiring TCs that have been reserved from incoming access.

Incoming Call

A number of TCs will be reserved for incoming calls, and incoming call processing is as follows:

(i) Check the CT database—if the ST is in the call_in_ progress state the call is rejected.

(ii) Check that an uplink TC of the required bandwidth is available. If there is bandwidth then a TC is reserved.

(iii) An incoming call setup message is broadcast over the CCC to inform the addressed ST of the incoming call and specify the TC on which to receive the call. If no TC is available but the CT forms part of a Service Domain, then the incoming call setup message is sent with a null TC otherwise the call is rejected. Service domains will be discussed in more detail later. The incoming call setup message is repeated a number of times.

(iv) The ST attempts uplink acquisition. The ST listens to the downlink and keeps trying for uplink acquisition until the CT sends a message to the ST to return the ST to the CCC. The ST will also run a timer to return it back to the CCC in the event of an incoming call failing to complete.

(v) On successful uplink acquisition, the CT authenticates the ST.

(vi) Rate switching is originated from the CT modem. A command is sent via the PC/CS to switch the downlink to the required bandwidth. The ST returns the rate switch command via the uplink PC/CS. The link is now of the required bandwidth.

Outgoing Call

Outgoing calls are supported by allowing slotted random access to the TC uplinks. The outgoing call processing is as follows:

(i) The CT publishes a 'free list' of available Traffic Channels and Priority Traffic Channels with their respective bandwidths. This list is published periodically (in preferred embodiments, every 500 ms) and is used to mark uplink access slots.

(ii) An off-hook condition is detected by the ST. The ST starts a call setup timer.

(iii) The ST waits for the next free list to be received over the CCC. If the Free list is empty the outgoing call is blocked. The ST will generate a congestion tone.

(iv) If the Free list has available channels, the ST picks a channel from the free list at random. The algorithm that the ST uses to pick a channel will need to be specified in the free list. For example, the ST may be required to always choose from a pool of minimum bandwidth channels so that high bandwidth channels remain available for high GOS users. Alternatively the ST may be allowed to choose any channel regardless of bandwidth for minimum blocking. In preferred embodiments, STs will not choose low bandwidth channels and negotiate the rate up.

(v) The ST attempts uplink acquisition on the specified TC, this process having been described earlier. If acquisition is successful then the outgoing call is processed. Otherwise the ST returns to the CCC and waits for the next available free list. To avoid a number of STs repetitively attempting to acquire the same TC, and blocking each other, a suitable protocol can be employed to govern how individual STs will act upon receipt of the free list.

(vi) The ST may be unable to acquire a TC by the time the call setup timer expires. The ST may in such cases cease attempting outgoing access and generate congestion tone.

Outgoing Priority Call

It is recognised that the random access protocol used to setup normal outgoing calls could lead to blocking. In preferred embodiments, access to a largely non-blocking Priority Traffic Channel will be allowed. Priority calling is complicated because the ST must:

(i) Capture and decode dialled digits.

(ii) Regenerate digits when a blocking condition occurs.

(iii) Allow transparent network access in a non-blocking condition.

(iv) Categorise all outgoing calls as priority or normal so that normal calls are dropped in favour of priority calls.

The priority call procedure in preferred embodiments is as follows:

(i) The CT will publish Directory Numbers (DNs) for a number of emergency services over the CCC.

(ii) The ST will attempt uplink access according to the normal algorithms. If the outgoing access is successful then the customer is able to dial as normal. All dialled digits are check against the emergency DN list so that calls may be categorised normal or priority at the CT.

(iii) If congestion tone is returned the customer is allowed to dial the emergency number into the ST. If the ST detects an emergency DN sequence then uplink access via the Priority Traffic Channel (PTC) is attempted.

(iv) On PTC acquisition, the ST relays the dialled digit sequence to the CT for dialling into the PSTN.

(iv) The CT converts the PTC to a TC and reallocates another TC to become the PTC, dropping a normal call in progress if necessary.

Interference Limiting (Pool Sizing)

Across a large scale deployment of cells, optimum capacity is achieved by minimising radio traffic while maintaining an acceptable grade of service. Lowest possible radio traffic results in improved 'carrier to interference' (C/I) ratios for users within the cell of interest and to co-channel users in nearby cells. The C/I ratio is a measure (usually expressed in dB) of how high above interference the transmitted signal needs to be to be decoded effectively. In preferred embodiments, the central terminal is provided with the ability to trade traffic for C/I, thereby allowing network planning to be carried out less rigidly. This feature can be realised by a system using CDMA as in preferred embodiments of the present invention, and is a benefit that CDMA offers over TDMA and FDMA systems.

In preferred embodiments, the CT will control the number of Traffic Channels to minimise access noise. TCs will be classified as:

(i) Busy—carrying traffic;

(ii) Access, Incoming (Access_In)—reserved for incoming access;

(iii) Access, Outgoing (Access_Out)—reserved for outgoing access—such TCs appear on the Free list;

(iv) Priority—reserved for priority outgoing access—such TCs appear in the Free list;

(v) Free—available for any purpose; and (vi) Locked—not available due to interference limiting.

Figure 16:
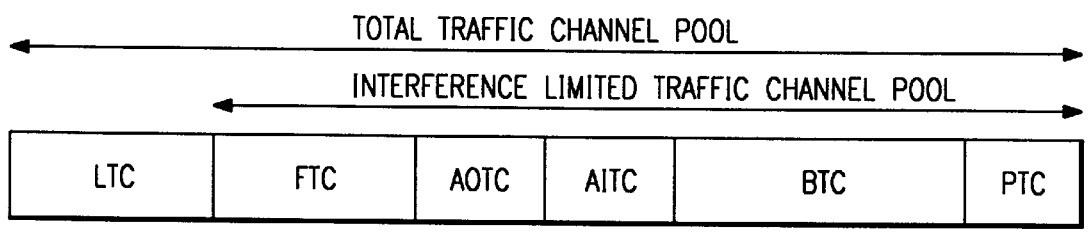
FIG. 16 illustrates how the available traffic channels are classified in preferred embodiments of the present invention.

This classification scheme is illustrated in FIG. 16. The CT will allocate traffic on the following basis:

(i) The CT will monitor incoming and outgoing call setup-times and convert Access TCs from Free TCs in order to achieve a required grade of service.

(ii) When a call is setup, an Access TC is converted to a Busy TC. If a Free TC is available, it is converted to a new Access TC. If there are no Free TCs then the Access TC is lost until a call clears.

(iii) When a call clears the Busy TC is converted to a Free TC. If a previous call setup resulted in a lost Access TC then the Busy TC is converted back into an Access TC.

(iv) When the PTC is accessed, a new PTC is created by converting a Free, Access or Busy (normal call) TC.

(v) The CT will monitor the Busy TC downlink and uplink soft error counts in an attempt to establish link quality. If the CT records a lower than average soft error count and long call setup times are being recorded, a Locked TC may be converted to a Free TC. Conversely, if the CT records a higher than average soft error count, a Free or Access TC may be converted to a Locked TC.

Figure 17:
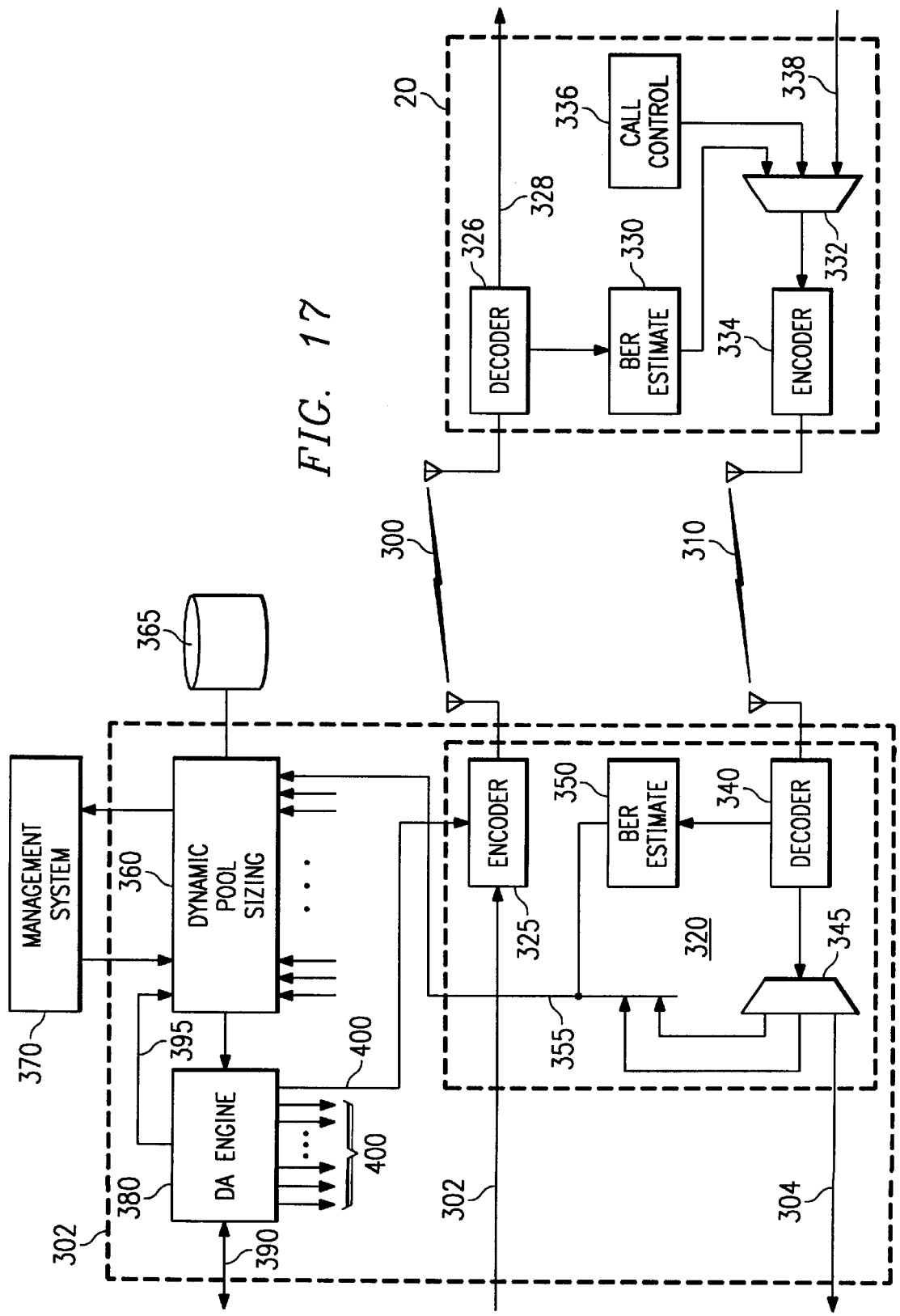
FIG. 17 illustrates the elements used by the central terminal to perform interference limiting.

FIG. 17 illustrates how the central terminal performs the above interference limiting function. When incoming call data arrives at a central terminal modem 320, encoder 325 encodes the data for transmission over the wireless link 300 to the subscriber terminal 20. At the subscriber terminal 20, the decoder 326 decodes the data, and passes the decoded user data over line 328 to the subscriber telecommunications equipment. As the decoder 326 decodes the data, it is able to establish a bit error rate (BER) estimate 330 associated with the signal transmission over the wireless link 300, which can be passed to the multiplexer 332 for combining with other signals, such as those from a call control function 336 or user data on line 338, before being passed to an encoder 334. Here, the BER estimate is encoded and passed on the OMC channel over the wireless link 310 to the decoder 340 within the central terminal modem 320. Once decoded by the decoder 340, the signal passes to the multiplexer 345, where the BER estimate from the subscriber terminal is detected and passed over line 355 to the dynamic pool sizing function 360.

Further, as at the subscriber terminal 20, the decoder 340 within the central terminal modem 320 is able to establish a bit error rate estimate 350 associated with the signal transmission over the wireless link 310. This BER estimate 350 is also passed over line 355 to the dynamic pool sizing function 360. The dynamic pool sizing function 360 is provided on the CT modem shelf 302, and receives BER estimates from each of the modems on that shelf indicated by the lines entering the bottom of the dynamic pool sizing function 360.

In addition to BER estimates, grade of service (GOS) data is obtained from two sources. Firstly, at each subscriber terminal 20, the call control function 336 will note how readily it is able to establish traffic channels for transmitting and receiving data, and from this can provide a GOS estimate to the multiplexer 332 for encoding by the encoder 334 for subsequent transmission over the wireless link 310 to the central terminal modem 320. Here, the GOS estimate is decoded by decoder 340, passed through multiplexer 345, and then the GOS estimate is passed over line 355 to the dynamic pool sizing function 360.

Additionally, incoming call information to the central terminal, other than call information from the subscriber terminals 20 connected to the central terminal, is provided over the concentrated network interface 390 to the DA engine 380. The DA engine 380 includes a call control function, similar to the call control function 336 in each of the subscriber terminals 20, for each of the modems on the modem shelf. Hence, in a similar fashion to the call control function 336 at the subscriber terminals 20, the call control functions within the DA engine 380 are also able to provide GOS estimates for incoming calls, and these GOS estimates are passed over line 395 to the dynamic pool sizing function 360.

At set up, the management system 370 within the element manager will have connected to the central terminal, and provided the dynamic pool sizing function 360 within the modem shelf with data identifying a BER goal, a GOS goal, and a pool size limit (i.e. the number of channels that can be used for data traffic). The dynamic pool sizing function 360 then compares this data from the management system with the actual BER, actual GOS, and the actual pool size information that it receives. A suitable algorithm can be provided within the dynamic pool sizing function 360 to determine, based on this information, whether pool sizing is appropriate. For example, if the actual bit error rate exceeds the BER goal provided by the management system 370, then the dynamic pool sizing function 360 may be arranged to send a pool sizing request to the demand assignment engine 380.

The demand assignment engine 380 provides modem enable signals over lines 400 to each of the modems on the CT modem shelf. If the dynamic pool sizing function 360 has requested that the DA engine 380 perform pool sizing, then the DA engine 380 can disable one or more of the modems, this causing the interference, and hence the actual BER, to be reduced. Apart from being used for interference limiting, the DA engine is also responsible, in preferred embodiments, for providing the encoders 325 with instructions on which set of overlay codes or how many TDM slots to be used for signals to be transmitted to the STs 20.

The dynamic pool sizing function can store the BER and GOS information received in the storage 365, and periodically may pass that data to the management system 370 for analysis. Further, if the system is unable to attain the BER or GOS goal with the allocated pool size, the dynamic pool sizing function can be arranged to raise an alarm to the management system. The receipt of this alarm will indicate to personnel using the management system that manual intervention may be required to remedy the situation, eg by the provision of more central terminal hardware to support the STs.

The CDMA approach used in preferred embodiments exhibits the property that the removal of any of the orthogonal channels (by disabling the modem) will improve the resistance of the other channels to interference. Hence, a suitable approach for the demand assignment engine 380, upon receipt of pool sizing request from the dynamic pool sizing function 360, is to disable the modem that has the least traffic passing through it.

RF Channel Switching

In preferred embodiments, it has been realised that if an ST is allowed to operate from more than one CT Modem Shelf/RF Channel then the following benefits may be realised:

(i) Fault tolerance—should a CT Modem Shelf subsystem fault occur, an ST may switch to an alternative frequency for service.

(ii) Call blocking—an ST denied service from one CT shelf may choose to switch to an alternative frequency for service.

(iii) Traffic load balancing—the Element Manager may on the basis of call blocking statistics choose to move STs between CT shelves.

(iv) Frequency diversity—in the presence of channel selective fading (slow multipath) an ST may operate on the frequency channel offering highest signal strength and lowest soft error count.

Figure 18:
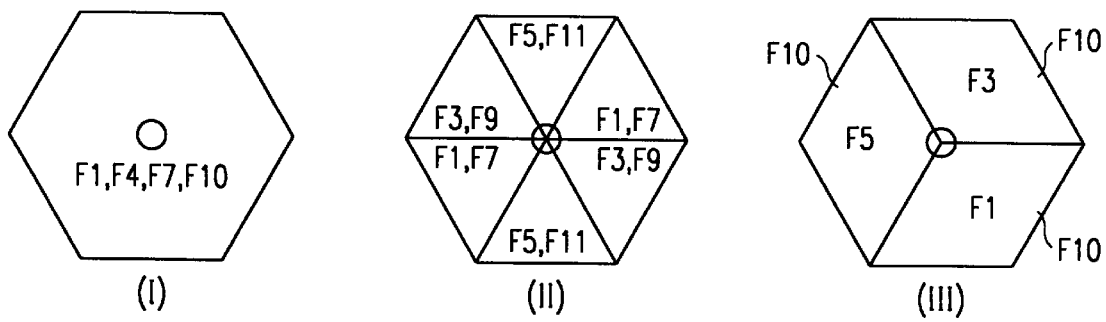
FIG. 18 illustrates possible antenna configurations that can be employed in a wireless telecommunications system in accordance with the preferred embodiment of the present invention.

RF channel switching is only possible where there are two or more co-located CT shelves serving the same geographical area on different RF frequency channels within the same RF band. A deployment that meets this criterion may be configured as a 'Service Domain'. Possible deployment scenarios are illustrated in FIG. 18. FIG. 18(*i*) shows an arrangement where omni antennae are used to provide the entire cell with four frequency channels, eg F1, F4, F7, F10. FIG. 18(*ii*) shows an arrangement where sectored antennae are used to provide six separate sectors within a cell, each sector being covered by two frequency channels. FIG. 18(*iii*) shows an alternative arrangement where three sectored antennae are used to divide the cell in to three sectors, each sector being covered by a separate frequency channel, and then an omni antenna is used to provide an 'umbrella' coverage for the entire cell, this coverage employing a frequency channel different to the three frequency channels used by the sectored antennae.

For the system to work effectively, the STs must be able to switch channels quickly, and fast channel switching necessitates that CT shelf synchronisation be provided at the following levels:

(i) CDMA PN code. This preserves uplink code phase across RF channels during warm start; and (ii) RF carrier frequency. This eliminates the need for the coarse frequency search on a downlink RF channel switch.

On installation, an ST will be programmed with an RF channel and PN code, these codes specifying the ST's initial home channel.

Figure 19A:
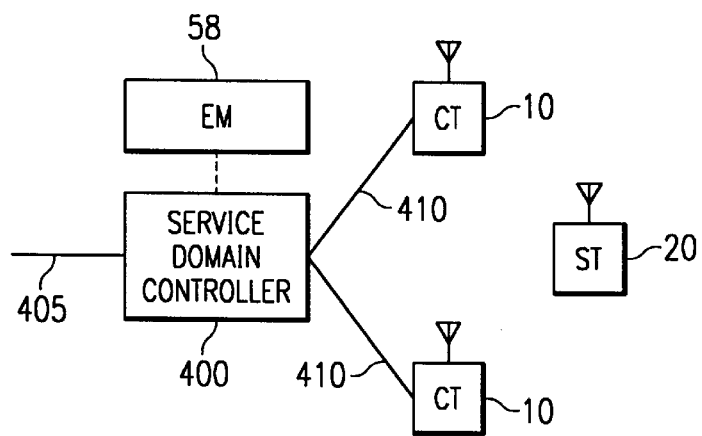
FIGS. 19A and 19B illustrate how channel switching is facilitated in preferred embodiments of the present invention.

The manner in which channel switching is facilitated in preferred embodiments will be described with reference to FIGS. 19A and 19B. A service domain controller 400 is preferably provided to act as an interface between the exchange connected to the service domain controller over path 405 and a number of central terminals 10 connected to the service domain controller over paths 410. The central terminals connected to the service domain controller form a 'service domain' of central terminals that may be used by a subscriber terminal 20 for handling communications.

In preferred embodiments, the service domain controller 400 is used to provide each CT 10 with appropriate information about the other CTs within the service domain. Each CT can then broadcast a 'Service Domain' message comprising a list of RF frequencies and CT Identifiers that form a Service Domain to be used by the STs for subsequent RF switching functions. The ST then stores this information for future reference when establishing a link with one of the CTs. It is preferable for each CT to broadcast the service domain message since an ST may be listening to any of the CTs at the time that the message is broadcast.

Each CT database will hold an entry for every ST located within the Service Domain. Each database entry describes how the CT views it's relationship with the ST and may be marked as:

(i) Primary service provider—the CT is the ST's home channel. All management communication with an ST is via it's home CT.

(ii) Supplying backup service the CT is providing service to the ST.

(iii) Available for backup service—the CT will provide service to the ST if required.

It should be noted that the ST need not switch to an entirely different CT, but can instead switch to a different CT shelf (and hence different RF frequency channel) within the same CT. However, in preferred embodiments, the ST will typically switch to a different CT, since some errors experienced by one CT shelf may also affect other shelves within the same CT, and so for fault tolerance (described in more detail below), it is preferable for the ST to switch to a separate CT.

Database consistency across CT shelves is preferably supported through the service domain controller 400. Database consistency needs to be real-time so that an ST entering the network is allowed full Service Domain access immediately (the Service Domain message is broadcast to all STs, and so a new ST will expect access across the full Service Domain).

Incoming access via backup CTs requires some function to be provided to broadcast duplicate incoming call setup messages to all CTs that form a Service Domain. Preferably this is handled by the service domain controller 400, which forwards incoming call setup messages to each CT operating in the service domain. All CTs will allocate Access_In Traffic Channels and relay the incoming call setup message via the Call Control Channel. On successful uplink access, one CT will respond to the service domain controller with a call accepted message, the other CTs will eventually respond with call setup failed messages. Outgoing access via a backup CT is similar to normal outgoing access.

Another job which can be performed by the service domain controller is to assist the element manager 58 in reconfiguring equipment in the event of a fault. For example, if one CT is taken out of commission because of a fault, a different CT can be brought 'on-line', and the service domain controller can provide that new CT with the necessary information about the other CTs in the service domain.

Figure 19B:
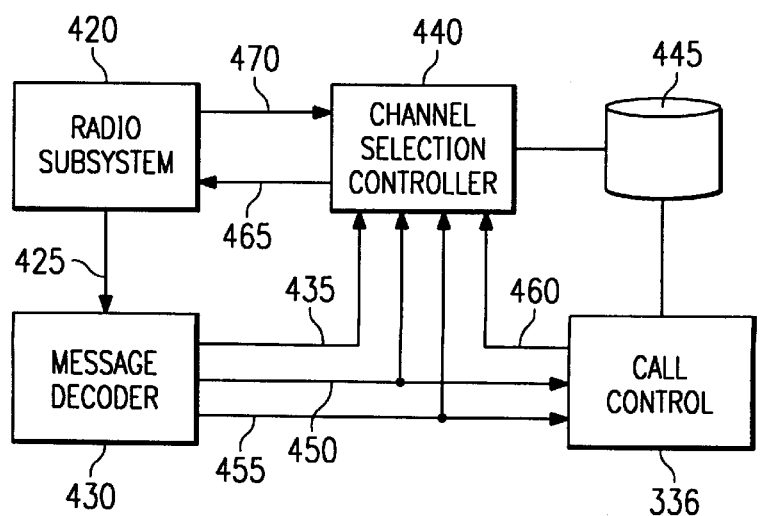

FIG. 19B illustrates those elements of the subscriber terminal used to implement RF channel switching. The radio subsystem 420, which incorporates the transmission and reception signal processing stages, will pass any data received on the call control channel over line 425 to the message decoder 430. If the decoder 430 determines that the data on the call control channel forms a service domain message, then this is passed over line 435 to the channel selection controller 440, where the information within the service domain message is stored in storage 445.

Similarly, if the message decoder identifies the data as a 'free list' identifying the available traffic channels on a particular RF frequency, then this data is passed to the call control function 336 and the channel selection controller 440 over path 450. The call control function 336 stores the free list in the storage 445 for subsequent use by the call control function 336 and the channel selection controller 440.

If the message decoder 430 determines that the data forms an incoming call setup message, then that information is supplied over line 455 to the call control function 336 and the channel selection controller 440 for processing. The incoming call setup message will typically specify a TC on the current frequency channel which should be used to access the incoming call, and the channel selection controller will attempt to establish a link on that TC. The channel selection controller will in such cases instruct the radio sub-system 420 over line 465 to use the current frequency channel to establish the required link. If, on the other hand, the traffic channel specified in the call setup message is 'null', the channel selection controller has the option to change RF frequency using the information stored in storage 445 about the other CTs in the service domain.

To enable the channel selection controller 440 to receive information about the status of links, a link operating status signal can be supplied over line 470 from the radio sub-system. This signal will give an indication of the radio link quality, and may be a simple 'OK' or 'failed' indication, or alternatively may include extra information such as BER values for the link. This information can be used by the channel selection controller to determine whether a particular frequency channel should be used or not.

To enable the call control function to specify a specific Access-Out channel for outgoing calls, a line 460 is provided between the call control function 336 and the channel selection controller 440. The call control function 336 may choose an access-out channel from the free list in storage 445, and instruct the channel selection controller over line 460 to attempt acquisition of that channel.

The following examples indicate how the above described structure may be used to perform channel switching in particular circumstances.

RF Channel Switching for Fault Tolerance

Should one RF channel suffer complete loss of downlink, the following process takes place in preferred embodiments:

(i) The ST will attempt downlink re-acquisition for a period of time, say 20 seconds.

(ii) If acquisition fails, the channel selection controller 440 of the ST will select the next available channel from the Service Domain information in storage 445 and attempt downlink acquisition. This process will be repeated until a downlink signal is acquired.

(iii) Once a backup RF channel is located, the ST will 'camp' on the Call Control Channel and may subsequently be granted traffic access.

(iv) If the CT fault persists, the EM 58 may use the service domain controller 400 to reconfigure the Service Domain so that the functioning CT shelves become primary service providers for the pool of 'homeless' STs.

A fault that does not result in complete loss of downlink signal will not result in RF channel switching 'en mass'. Rather, a fault may result in excessive or total call blocking, as discussed below.

RF Channel Switching for Call Blocking

If Incoming access traffic channels are being blocked, the following process is employed in preferred embodiments:

(i) The call setup message sent over the Call Control Channel will specify a TC on which to access the call.

(ii) In the case of incoming access being blocked, the CT will specify a null TC. The channel selection controller 440 of the ST will in such cases switch to the next RF channel from the Service Domain information in storage 445 and monitor the Call Control Channel.

(iii) If the ST receives a call setup message with a valid TC, then the call is processed as normal.

(iv) When the call clears, the ST downlink preferably switches back to the home CT.

If Outgoing access traffic channels are being blocked, the following process is employed in preferred embodiments:

(i) The ST registers an off-hook. The Free List in storage 445 is checked and if a traffic channel is available, then the call control function 336 asserts a channel request on line 460 to the channel selection controller 440 and normal uplink access is attempted.
  (ii) If the Free List shows no Access_Out channels are available on the current frequency channel, then the channel selection controller will be used to switch the ST to the next RF channel in the Service Domain, whereupon the ST will wait for the next Free List.
  (iii) When the ST finds a Free List with an available Access_Out channel, then uplink access is attempted and the call is processed as normal.
  (iv) When the call clears, the ST downlink preferably switches back to the home CT.

RF Channel Switching for Traffic Load Balancing

Traffic load balancing is, in preferred embodiments, provided by static configuration via the EM 58. Call blocking and setup time statistics may be forwarded to the EM where an operator may decide to move an ST to another RF channel.

RF Channel Switching for Frequency Diversity

Frequency diversity is, in preferred embodiments, provided by static configuration via the EM 58. Radio link statistics may be forwarded to the EM where an operator may decide to move an ST to another RF channel.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

What is claimed is:

1. A transmission controller for processing data items to be transmitted over a wireless link connecting a central terminal and a subscriber terminal of a wireless telecommunications system, a single frequency channel being employed for transmitting data items pertaining to a plurality of wireless links, the transmission controller comprising:

an orthogonal code generator for providing an orthogonal code from a set of 'm' orthogonal codes used to create 'm' orthogonal channels within the single frequency channel, wherein 'm' is a positive integer;

a first encoder for combining a data item to be transmitted on the single frequency channel with said orthogonal code from the orthogonal code generator, the orthogonal code determining the orthogonal channel over which the data item is transmitted, whereby data items pertaining to different wireless links may be transmitted simultaneously within different orthogonal channels of said single frequency channel;

an overlay code generator for providing an overlay code from a first set of 'n' overlay codes which are orthogonal to each other, wherein 'n' is a positive integer; and a second encoder arranged to apply the overlay code from the overlay code generator to said data item, whereby 'n' data items pertaining to different wireless links may be transmitted simultaneously within the same orthogonal channel.

2. A transmission controller as claimed in claim 1, wherein the overlay code generator is arranged to provide overlay codes from one or more further sets of overlay codes having different numbers of overlay codes to said first set of overlay codes.

3. A transmission controller as claimed in claim 1, wherein the orthogonal code generator is a storage arranged to store the set of orthogonal codes.

4. A transmission controller as claimed in claim 1, wherein the overlay code generator is a storage arranged to store the set of overlay codes.

5. A transmission controller as claimed in claim 1, wherein the set of orthogonal codes comprise a set of Rademacher-Walsh (RW) codes.

6. A transmission controller as claimed in claim 5, wherein the set of overlay codes are derived from RW codes, each set of 'n' overlay codes comprising an n×n matrix of RW codes.

7. A central terminal of a wireless telecommunications system, comprising:

a transmission controller having:

an orthogonal code generator for providing an orthogonal code from a set of 'm' orthogonal codes used to create 'm' orthogonal channels within the single frequency channel, wherein 'm' is a positive integer;

a first encoder for combining a data item to be transmitted on the single frequency channel with said orthogonal code from the orthogonal code generator, the orthogonal code determining the orthogonal channel over which the data item is transmitted, whereby data items pertaining to different wireless links may be transmitted simultaneously within different orthogonal channels of said single frequency channel;

an overlay code generator for providing an overlay code from a first set of 'n' overlay codes which are orthogonal to each other, wherein 'n' is a positive integer;

a second encoder arranged to apply the overlay code from the overlay code generator to said data item, whereby 'n' data items pertaining to different wireless links may be transmitted simultaneously within the same orthogonal channel, wherein the overlay code generator is arranged to provide overlay codes from one or more further sets of overlay codes having different numbers of overlay codes to said first set of overlay codes, wherein the orthogonal code generator is a storage arranged to store the set of orthogonal codes, wherein the overlay code generator is a storage arranged to store the set of overlay codes, wherein the set of orthogonal codes comprise a set of Rademacher-Walsh (RW) codes, and wherein the set of overlay codes are derived from RW codes, each set of 'n' overlay codes comprising an n×n matrix of RW codes.

8. A central terminal as claimed in claim 7, wherein a first of the orthogonal channels is reserved for the transmission of signals relating to the acquisition of wireless links, and the transmission controller is provided in the central terminal to enable overlay codes to be applied to data items to be sent within said first orthogonal channel from the central terminal to one of said subscriber terminals.

9. A central terminal as claimed in claim 8, wherein a second of the orthogonal channels is reserved for the transmission of signals relating to the control of calls, and the transmission controller is provided in the central terminal to enable overlay codes to be applied to data items to be sent within said second orthogonal channel from the central terminal to one of said subscriber terminals.

10. A central terminal as claimed in claim 7, further comprising channelisation means for determining which of the orthogonal channels will be subject to overlay codes, and for transmitting that information to a plurality of subscriber terminals within the wireless telecommunications system.

11. A central terminal as claimed in claim 7, wherein a number of said orthogonal channels are designated as traffic channels for the transmission of data items relating to communication content, said central terminal further comprising:
   a TDM encoder arranged to apply time division multiplexing (TDM) techniques to data items to be sent over a traffic channel from said central terminal to said subscriber terminal, so as to enable a plurality of data items pertaining to different wireless links to be sent within one orthogonal traffic channel during a predetermined frame period.

12. A reception controller for processing data items received over a wireless link connecting a central terminal and a subscriber terminal of a wireless telecommunications system, a single frequency channel being employed for transmitting data items pertaining to a plurality of wireless links, the receiver controller comprising:
   an orthogonal code generator for providing an orthogonal code from a set of 'm' orthogonal codes used to create 'm' orthogonal channels within the single frequency channel, wherein 'm' is a positive integer;
   a first encoder for applying, to signals received on the single frequency channel, the orthogonal code provided by the orthogonal code generator, in order to isolate data items transmitted within the corresponding orthogonal code;
   an overlay code generator for providing an overlay code from a first set of 'n' overlay codes which are orthogonal to each other, the set of 'n' overlay codes enabling 'n' data items pertaining to different wireless links to be transmitted simultaneously within the same orthogonal channel, wherein 'n' is a positive integer; and
   a second encoder for applying, to the data items of the orthogonal channel, the overlay code from the overlay code generator so as to isolate a particular data item transmitted using that overlay code.

13. A reception controller as claimed in claim 12, wherein the overlay code generator is arranged to provide overlay codes from one or more further sets of overlay codes having different numbers of overlay codes to said first set of overlay codes.

14. A reception controller as claimed in claim 12, wherein the orthogonal code generator is a storage arranged to store the set of orthogonal codes.

15. A reception controller as claimed in claim 12, wherein the overlay code generator is a storage arranged to store the set of overlay codes.

16. A reception controller as claimed in claim 12, wherein the set of orthogonal codes comprise a set of Rademacher-Walsh (RW) codes.

17. A controller as claimed in claim 12, wherein the set of overlay codes are derived from RW codes, each set of 'n' overlay codes comprising an n×n matrix of RW codes.

18. A central terminal of a wireless telecommunications system, comprising:
   a reception controller having:
   an orthogonal code generator for providing an orthogonal code from a set of 'm' orthogonal codes used to create 'm' orthogonal channels within the single frequency channel, wherein 'm' is a positive integer;
   a first decoder for applying, to signals received on the single frequency channel, the orthogonal code provided by the orthogonal code generator, in order to isolate data items transmitted within the corresponding orthogonal channel;
   an overlay code generator for providing an overlay code from a first set of 'n' overlay codes which are orthogonal to each other, the set of 'n' overlay codes enabling 'n' data items pertaining to different wireless links to be transmitted simultaneously within the same orthogonal channel, wherein 'n' is a positive integer; and
   a second decoder for applying, to the data items of the orthogonal channel, the overlay code from the overlay code generator so as to isolate a particular data item transmitted using that overlay code.

19. A central terminal as claimed in claim 18, further comprising channelisation means for determining which of the orthogonal channels will be subject to overlay codes, and for transmitting that information to a plurality of subscriber terminals within the wireless telecommunications system.

20. A central terminal as claimed in claim 19, wherein the channelisation means also determines, for those orthogonal channels subject to overlay codes, which set of overlay codes will apply to each orthogonal channel.

21. A subscriber terminal of a wireless telecommunications system, comprising:
   a transmission controller having:
   an orthogonal code generator for providing an orthogonal code from a set of 'm' orthogonal codes used to create 'm' orthogonal channels within the single frequency channel, wherein 'm' is a positive integer;
   a first encoder for combining a data item to be transmitted on the single frequency channel with said orthogonal code from the orthogonal code generator, the orthogonal code determining the orthogonal channel over which the data item is transmitted, whereby data items pertaining to different wireless links may be transmitted simultaneously within different orthogonal channels of said single frequency channel;
   an overlay code generator for providing an overlay code from a first set of 'n' overlay codes which are orthogonal to each other, wherein 'm' is a positive integer;
   a second encoder arranged to apply the overlay code from the overlay code generator to said data item, whereby 'n' data items pertaining to different wireless links may be transmitted simultaneously within the same orthogonal channel, wherein the overlay code generator is arranged to provide overlay codes from one or more further sets of overlay codes having different numbers of overlay codes to said first set of overlay codes, wherein the orthogonal code generator is a storage arranged to store the set of orthogonal codes, wherein the set of orthogonal codes comprise a set of Rademacher-Walsh (RW) codes, and wherein the set of overlay codes are derived from RW codes, each set of 'n' overlay codes comprising an n×n matrix of RW codes; the transmission controller operable to enable overlay codes to be applied to data items sent from the subscriber terminals to the central terminal.

22. A subscriber terminal of a wireless telecommunications system, comprising:
   a reception controller having:
   an orthogonal code generator for providing an orthogonal code from a set of 'm' orthogonal codes used to create 'm' orthogonal channels within the single frequency channel, wherein 'm' is a positive integer;
   a first decoder for applying, to signals received on the single frequency channel, the orthogonal code provided by the orthogonal code generator, in order to isolate data items transmitted within the corresponding orthogonal channel;

an overlay code generator for providing an overlay code from a first set of 'n' overlay codes which are orthogonal to each other, the set of 'n' overlay codes enabling 'n' data items pertaining to different wireless links to be transmitted simultaneously within the same orthogonal channel, wherein 'n' is a positive integer;

a second decoder for applying, to the data items of the orthogonal channel, the overlay code from the overlay code generator so as to isolate a particular data item transmitted using that overlay code, wherein the overlay code generator is arranged to provide overlay codes from one or more further sets of overlay codes having different numbers of overlay codes to said first set of overlay codes, wherein the orthogonal code generator is a storage arranged to store the set of orthogonal codes, wherein the overlay code generator is a storage arranged to store the set of overlay codes, wherein the set of orthogonal codes comprise a set of Rademacher-Walsh (RW) codes, and wherein the set of overlay codes are derived from RW codes, each set of 'n' overlay codes comprising an n×n matrix of RW codes.

23. A wireless telecommunications system comprising a central terminal and a plurality of subscriber terminals, wherein the central terminal comprises:

a transmission controller having:

an orthogonal code generator for providing an orthogonal code from a set of 'm' orthogonal codes used to create 'm' orthogonal channels within the single frequency channel, wherein 'm' is a positive integer;

a first encoder for combining a data item to be transmitted on the single frequency channel with said orthogonal code from the orthogonal code generator, the orthogonal code determining the orthogonal channel over which the data item is transmitted, whereby data items pertaining to different wireless links may be transmitted simultaneously within different orthogonal channels of said single frequency channel;

an overlay code generator for providing an overlay code from a first set of 'n' overlay codes which are orthogonal to each other, wherein 'n' is a positive integer; and a second encoder arranged to apply the overlay code from the overlay code generator to said data item, whereby 'n' data items pertaining to different wireless links may be transmitted simultaneously within the same orthogonal channel; and at least one of the subscriber terminal comprises:

a reception controller having:

an orthogonal code generator for providing an orthogonal code from a set of 'm' orthogonal codes used to create 'm' orthogonal channels within the single frequency channel;

a first decoder for applying, to signals received on the single frequency channel, the orthogonal code provided by the orthogonal code generator, in order to isolate data items transmitted within the corresponding orthogonal channel;

an overlay code generator for providing an overlay code from a first set of 'n' overlay codes which are orthogonal to each other, the set of 'n' overlay codes enabling 'n' data items pertaining to different wireless links to be transmitted simultaneously within the same orthogonal channel; and a second decoder for applying, to the data items of the orthogonal channel, the overlay code from the overlay code generator so as to isolate a particular data item transmitted using that overlay code.

24. A wireless telecommunications system comprising a central terminal and a plurality of subscriber terminals, wherein at least one of the subscriber terminals comprises:

a transmission controller having:

an orthogonal code generator for providing an orthogonal code from a set of 'm' orthogonal codes used to create 'm' orthogonal channels within the single frequency channel, wherein 'm' is a positive integer;

a first encoder for combining a data item to be transmitted on the single frequency channel with said orthogonal code from the orthogonal code generator, the orthogonal code determining the orthogonal channel over which the data item is transmitted, whereby data items pertaining to different wireless links may be transmitted simultaneously within different orthogonal channels of said single frequency channel;

an overlay code generator for providing an overlay code from a first set of 'n' overlay codes which are orthogonal to each other, wherein 'n' is a positive integer; and a second encoder arranged to apply the overlay code from the overlay code generator to said data item, whereby 'n' data items pertaining to different wireless links may be transmitted simultaneously within the same orthogonal channel; and the central terminal comprises:

a reception controller having:

an orthogonal code generator for providing an orthogonal code from a set of 'm' orthogonal codes used to create 'm' orthogonal channels within the single frequency channel;

a first decoder for applying, to signals received on the single frequency channel, the orthogonal code provided by the orthogonal code generator, in order to isolate data items transmitted within the corresponding orthogonal channel;

an overlay code generator for providing an overlay code from a first set of 'n' overlay codes which are orthogonal to each other, the set of 'n' overlay codes enabling 'n' data items pertaining to different wireless links to be transmitted simultaneously within the same orthogonal channel; and a second decoder for applying, to the data items of the orthogonal channel, the overlay code from the overlay code generator so as to isolate a particular data item transmitted using that overlay code.

25. A method of processing data items to be transmitted over a wireless link connecting a central terminal and a subscriber terminal of a wireless telecommunications system, a single frequency channel being employed for transmitting data items pertaining to a plurality of wireless links, the method comprising steps of:

providing an orthogonal code from a set of 'm' orthogonal codes used to create 'm' orthogonal channels within the single frequency channel, wherein 'm' is a positive integer;

combining a data item to be transmitted on the single frequency channel with said orthogonal code, the orthogonal code determining the orthogonal channel over which the data item is transmitted, whereby data items pertaining to different wireless links may be transmitted simultaneously within different orthogonal channels of said single frequency channel;

providing an overlay code from a first set of 'n' overlay codes which are orthogonal to each other, wherein 'n' is a positive integer; and applying the overlay code to said data item, whereby 'n' data items pertaining to different wireless links may be transmitted simultaneously within the same orthogonal channel.

26. A method as claimed in claim 25, further comprising a step of:

providing one or more further sets of overlay codes having different numbers of overlay codes to said first set of overlay codes.

27. A method as claimed in claims 25, further comprising steps of:

determining which of the orthogonal channels will be subject to overlay codes; and transmitting that information to a plurality of subscriber terminals within the wireless telecommunications system.

28. A method as claimed in claim 27, further comprising a step of:

determining, for those orthogonal channels subject to overlay codes, which set of overlay codes will apply to each orthogonal channel.

29. A method of processing data items received over a wireless link connecting a central terminal and a subscriber terminal of a wireless telecommunications system, a single frequency channel being employed for transmitting data items pertaining to a plurality of wireless links, the method comprising the steps of providing an orthogonal code from a set of 'm' orthogonal codes used to create 'm' orthogonal channels within the single frequency channel, wherein 'm' is a positive integer;

applying, to signals received on the single frequency channel, the orthogonal code in order to isolate data items transmitted within the corresponding orthogonal channel;

providing an overlay code from a first set of 'n' overlay codes which are orthogonal to each other, the set of 'n' overlay codes enabling 'n' data items pertaining to different wireless links to be transmitted simultaneously within the same orthogonal channel, wherein 'n' is a positive integer; and applying, to the data items of the orthogonal channel, the overlay code so as to isolate a particular data item transmitted using that overlay code.

30. A method as claimed in claim 29, further comprising a step of:

providing one or more further sets of overlay codes having different numbers of overlay codes to said first set of overlay codes.

31. A method as claimed in claim 29, further comprising steps of:

determining which of the orthogonal channels will be subject to overlay codes; and transmitting that information to a plurality of subscriber terminals within the wireless telecommunications system.

32. A method as claimed in claim 31, further comprising a step of:

determining, for those orthogonal channels subject to overlay codes, which set of overlay codes will apply to each orthogonal channel.

* * * * *